(12) United States Patent
Brundick et al.

(10) Patent No.: US 10,450,152 B2
(45) Date of Patent: Oct. 22, 2019

(54) EXPANDLE GRAVITY-FEED BIN

(71) Applicant: Trade Fixtures, LLC, Little Rock, AR (US)

(72) Inventors: Ronald Brundick, Roland, AR (US); Scott Johnson, Little Rock, AR (US); John Clayton Odom, Benton, AR (US)

(73) Assignee: TRADE FIXTURES, LLC, Little Rock, AR (US)

( * ) Notice: Subject to any disclaimer, the term of this patent is extended or adjusted under 35 U.S.C. 154(b) by 0 days.

(21) Appl. No.: 15/877,308

(22) Filed: Jan. 22, 2018

(65) Prior Publication Data

US 2018/0155141 A1 Jun. 7, 2018

Related U.S. Application Data

(63) Continuation-in-part of application No. 15/050,035, filed on Feb. 22, 2016, now Pat. No. 9,872,572, which
(Continued)

(51) Int. Cl.
*B65G 65/48* (2006.01)
*B65D 88/66* (2006.01)
(Continued)

(52) U.S. Cl.
CPC .............. *B65G 65/489* (2013.01); *A47F 1/03* (2013.01); *B65D 47/261* (2013.01); *B65D 88/66* (2013.01); *A47F 1/08* (2013.01)

(58) Field of Classification Search
CPC ... A47F 1/02; A47F 1/03; A47F 1/035; B65G 65/40; G01F 11/006; G01F 11/003;
(Continued)

(56) References Cited

U.S. PATENT DOCUMENTS 181,680 A * 8/1876 House ................ B65D 83/0005
222/184
367,599 A 8/1887 Conant
(Continued)

FOREIGN PATENT DOCUMENTS

CN 2663350 Y 12/2004
DE 3325033 A1 3/1984
(Continued)

OTHER PUBLICATIONS

International Search Report, Patent Cooperation Treaty Application No. PCT/US2006/060428, dated Sep. 28, 2007.
(Continued)

*Primary Examiner* — Patrick M. Buechner
(74) *Attorney, Agent, or Firm* — Ronald J. Koch; The Eley Law Firm

(57) ABSTRACT

A gravity-feed bin includes a generally hollow main bin having an open end, a storage reservoir and a dispensing chute. The dispensing chute has an opening disposed near a distal end. The bin includes a dispensing gate movable between open and closed positions. When the dispensing gate is in the closed position, the dispensing gate blocks the opening of the dispensing chute. The main bin includes a vertical front wall joined to planar first front surface that is disposed below the vertical front wall, at an angle relative to the vertical front wall so as to direct bulk material inwardly towards the interior of the storage reservoir. A second planar front surface is joined to the first front surface, and disposed at an angle relative to the first front surface, so as to direct the bulk material towards the dispensing chute.

3 Claims, 27 Drawing Sheets

Related U.S. Application Data is a continuation-in-part of application No. 14/281,502, filed on May 19, 2014, now Pat. No. 9,278,788, which is a continuation-in-part of application No. 14/148,396, filed on Jan. 6, 2014, now Pat. No. 9,185,996.

(60) Provisional application No. 61/749,311, filed on Jan. 5, 2013.

(51) Int. Cl.
    *A47F 1/03*           (2006.01)
    *B65D 47/26*        (2006.01)
    *A47F 1/08*           (2006.01)

(58) Field of Classification Search
    CPC ........ G01F 11/20; G01F 11/24; G01F 11/282;
              G01F 11/46; G01F 15/16; B65D 47/261
    USPC ..................... 222/181.1, 184, 185
    See application file for complete search history.

(56) References Cited

U.S. PATENT DOCUMENTS

| | | | | |
|---|---|---|---|---|
| 557,274 | A | 3/1896 | Kade | |
| 670,792 | A | 3/1901 | Lippincott | |
| 751,984 | A * | 2/1904 | Hoon | B65D 83/0005 137/868 |
| 1,184,379 | A | 5/1916 | Ritter | |
| 1,224,136 | A | 5/1917 | Caskey | |
| 1,225,797 | A | 5/1917 | Gardner | |
| 1,317,274 | A | 9/1919 | Dierkes | |
| 1,771,545 | A | 7/1930 | Melvin | |
| 1,907,773 | A | 5/1933 | Fisher et al. | |
| 1,931,908 | A | 10/1933 | Tillotson | |
| 2,122,216 | A | 6/1938 | Seawell | |
| 2,131,651 | A | 9/1938 | Woo | |
| 2,150,753 | A | 3/1939 | Weinstein | |
| 2,326,414 | A | 8/1943 | Thompson | |
| 2,410,410 | A | 11/1946 | Garubo | |
| 2,447,409 | A | 8/1948 | Gulow | |
| 2,527,749 | A | 10/1950 | Lundeen | |
| 2,529,197 | A * | 11/1950 | Storberg | B60B 39/023 222/146.1 |
| 2,551,765 | A | 5/1951 | Sedor | |
| 2,598,388 | A * | 5/1952 | Hurter | B65D 88/64 222/185.1 |
| 2,663,466 | A | 12/1953 | Heltzel | |
| 2,764,308 | A | 9/1956 | Hoch | |
| 2,778,536 | A * | 1/1957 | Graves | A47F 1/035 222/184 |
| 2,940,642 | A * | 6/1960 | Strattman | A47F 1/03 222/185.1 |
| 3,138,297 | A | 6/1964 | McKinney | |
| 3,146,924 | A | 9/1964 | Cozadd et al. | |
| 3,198,390 | A * | 8/1965 | Beckman | A01J 9/04 206/459.5 |
| 3,223,290 | A * | 12/1965 | Schuld | A01K 5/0225 222/185.1 |
| 3,263,870 | A | 8/1966 | Hesford | |
| 3,512,805 | A | 5/1970 | Glatz | |
| 3,666,150 | A | 5/1972 | Liljeholm | |
| 3,680,566 | A | 8/1972 | Tanaka et al. | |
| 3,885,672 | A | 5/1975 | Westenrieder | |
| 3,997,072 | A | 12/1976 | Guth | |
| 4,212,415 | A | 7/1980 | Neely | |
| 4,298,038 | A | 11/1981 | Jennings | |
| 4,318,577 | A | 3/1982 | Vona | |
| 4,349,128 | A | 9/1982 | Sanfilippo | |
| 4,474,303 | A | 10/1984 | Maccise | |
| 4,562,941 | A | 1/1986 | Sanfilippo | |
| 4,592,494 | A | 6/1986 | Ellis et al. | |
| 4,619,379 | A | 10/1986 | Biehl | |
| D286,728 | S | 11/1986 | Elmore | |
| 4,660,733 | A * | 4/1987 | Snyder | B65D 88/08 220/634 |
| 4,683,674 | A | 8/1987 | Faul | |
| 4,718,578 | A | 1/1988 | Radek et al. | |
| 4,802,609 | A | 2/1989 | Morse et al. | |
| 4,889,263 | A | 12/1989 | Ellis et al. | |
| 4,903,866 | A | 2/1990 | Loew | |
| 4,984,690 | A | 1/1991 | King et al. | |
| 5,016,789 | A * | 5/1991 | Singh | A47F 1/02 222/185.1 |
| 5,026,129 | A | 6/1991 | Merl | |
| 5,092,498 | A | 3/1992 | Willems et al. | |
| 5,105,991 | A | 4/1992 | Johnson | |
| D326,983 | S | 6/1992 | Elmore | |
| 5,139,173 | A * | 8/1992 | Evinger | A47F 1/03 222/156 |
| 5,180,069 | A | 1/1993 | Krummell | |
| 5,217,507 | A | 6/1993 | Spirig | |
| 5,308,158 | A | 5/1994 | Vogelsong et al. | |
| 5,375,744 | A | 12/1994 | Henderson | |
| 5,437,393 | A | 8/1995 | Blicher et al. | |
| 5,441,321 | A | 8/1995 | Karpisek | |
| 5,469,992 | A | 11/1995 | Jenkins | |
| 5,474,195 | A | 12/1995 | Pai | |
| 5,529,219 | A | 6/1996 | Ward | |
| 5,549,228 | A | 8/1996 | Brown | |
| 5,551,604 | A | 9/1996 | Kern et al. | |
| 5,560,519 | A | 10/1996 | Moore et al. | |
| 5,626,250 | A | 5/1997 | Dorazio | |
| D379,884 | S | 6/1997 | Eastman | |
| 5,673,823 | A * | 10/1997 | Hanks | B65D 1/20 222/185.1 |
| 5,709,319 | A * | 1/1998 | Yao | A01K 5/0291 222/170 |
| 5,730,333 | A | 3/1998 | Baluk et al. | |
| 5,826,754 | A | 10/1998 | Ishaya et al. | |
| 5,836,480 | A | 11/1998 | Epp et al. | |
| 5,839,587 | A | 11/1998 | Gress et al. | |
| 5,855,300 | A * | 1/1999 | Malki | A47G 19/34 222/153.09 |
| D413,767 | S | 9/1999 | Elmore | |
| D414,078 | S | 9/1999 | Elmore | |
| 6,029,859 | A | 2/2000 | Robbins, III | |
| 6,082,591 | A | 7/2000 | Healey | |
| 6,142,301 | A | 11/2000 | Lin et al. | |
| 6,182,864 | B1 | 2/2001 | Elmore | |
| 6,199,724 | B1 * | 3/2001 | Yeranossian | G07F 11/44 141/317 |
| 6,220,313 | B1 | 4/2001 | Estlander | |
| D441,530 | S | 5/2001 | Elmore | |
| 6,241,123 | B1 | 6/2001 | Elmore | |
| 6,276,547 | B1 | 8/2001 | Petryna | |
| D469,661 | S | 2/2003 | Rivkin | |
| D470,016 | S | 2/2003 | Rivkin | |
| D470,363 | S | 2/2003 | Rivkin | |
| D471,407 | S | 3/2003 | Rivkin | |
| 6,571,990 | B2 | 6/2003 | Bird | |
| 6,908,004 | B2 | 6/2005 | Barr | |
| 7,093,715 | B1 | 8/2006 | Apps | |
| 7,128,230 | B2 | 10/2006 | Jacobson et al. | |
| 7,178,697 | B2 | 2/2007 | Brundick | |
| 7,510,096 | B2 | 3/2009 | Wang | |
| 7,562,784 | B2 | 7/2009 | Stevenson | |
| 7,832,598 | B2 | 11/2010 | Rode et al. | |
| 7,975,866 | B2 | 7/2011 | Peterman et al. | |
| 8,245,452 | B2 | 8/2012 | Koteskey | |
| 9,872,572 | B1 * | 1/2018 | Brundick | A47F 1/03 |
| 2003/0150873 | A1 * | 8/2003 | Margalit | B29C 45/18 222/1 |
| 2005/0269366 | A1 * | 12/2005 | Brundick | A47F 1/03 222/185.1 |
| 2006/0186138 | A1 | 8/2006 | Brundick | |
| 2006/0191958 | A1 | 8/2006 | Brundick | |
| 2007/0131681 | A1 | 6/2007 | Pawlowski | |
| 2007/0138176 | A1 | 6/2007 | Gawlick | |

(56) References Cited

U.S. PATENT DOCUMENTS

| | | | |
|---|---|---|---|
| 2009/0120930 A1 | 5/2009 | Sexton | |
| 2010/0282770 A1* | 11/2010 | Mendes | A47F 1/03 221/204 |
| 2011/0062187 A1 | 3/2011 | Johnson | |
| 2011/0062190 A1 | 3/2011 | Johnson | |
| 2011/0248040 A1 | 10/2011 | McGregor | |
| 2014/0305970 A1* | 10/2014 | Musumeci | B65D 75/5844 222/228 |

FOREIGN PATENT DOCUMENTS

| | | |
|---|---|---|
| FR | 1309970 A | 3/1963 |
| GB | 2137602 A | 10/1984 |
| WO | 1998042240 A1 | 10/1998 |
| WO | 2001062127 A2 | 8/2001 |
| WO | 2004097697 A1 | 11/2004 |

OTHER PUBLICATIONS

International Search Report, Patent Cooperation Treaty Application No. PCT/US2001/006162, dated Aug. 28, 2001.
P.I.C. Bulk Dispenser Product Flyer, Puckerpowder, Creative Concepts, Irondale, AL, May 2013, www.puckerpowder.com.
Product Catalog, NewLeaf Designs, 1997, pp. 4-7, Vita-Bin(R) bin systems.
Product literature, Bestbins Corporation, May 19, 2005, 4 gal. and 8 gal. gravity feed bins with assembly instructions.
Product literature, Trade Fixtures NewLeaf Designs, gravity and scoop feed bins, May 10, 2004, http:/www.tradefixtures.com/bins/newleaf.htm.
International Search Report, Patent Cooperation Treaty Application No. PCT/US2014/010368, dated May 12, 2014.
European Search Report, Application EP14735266.0, dispatched Jun. 24, 2016.
Chinese Search Report, Application CN2014800039974, dated Jul. 19, 2016.

* cited by examiner

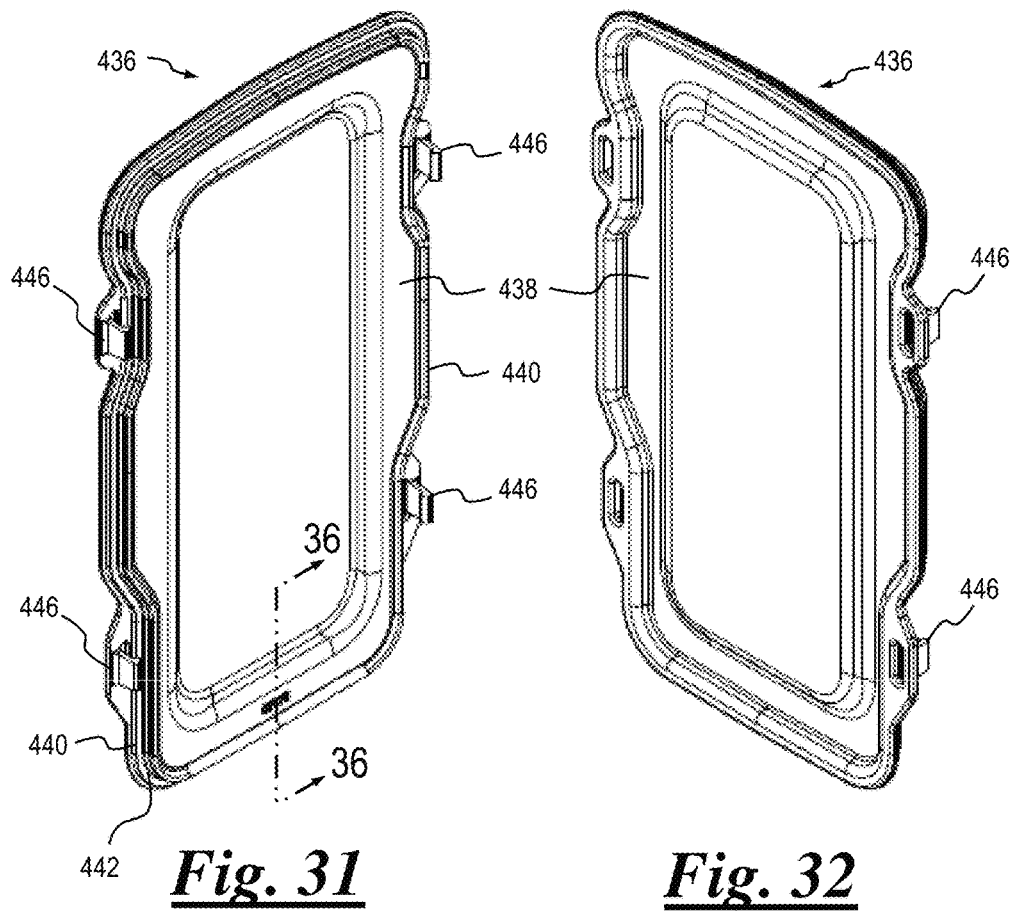
*Fig. 31*  *Fig. 32*
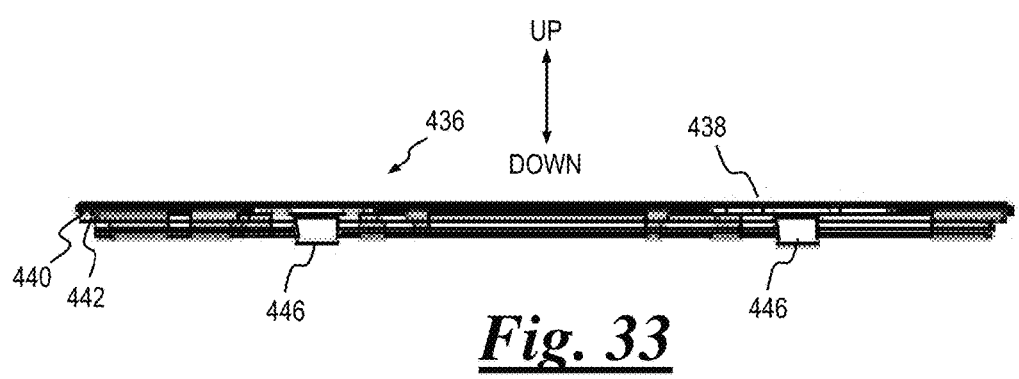
*Fig. 33*

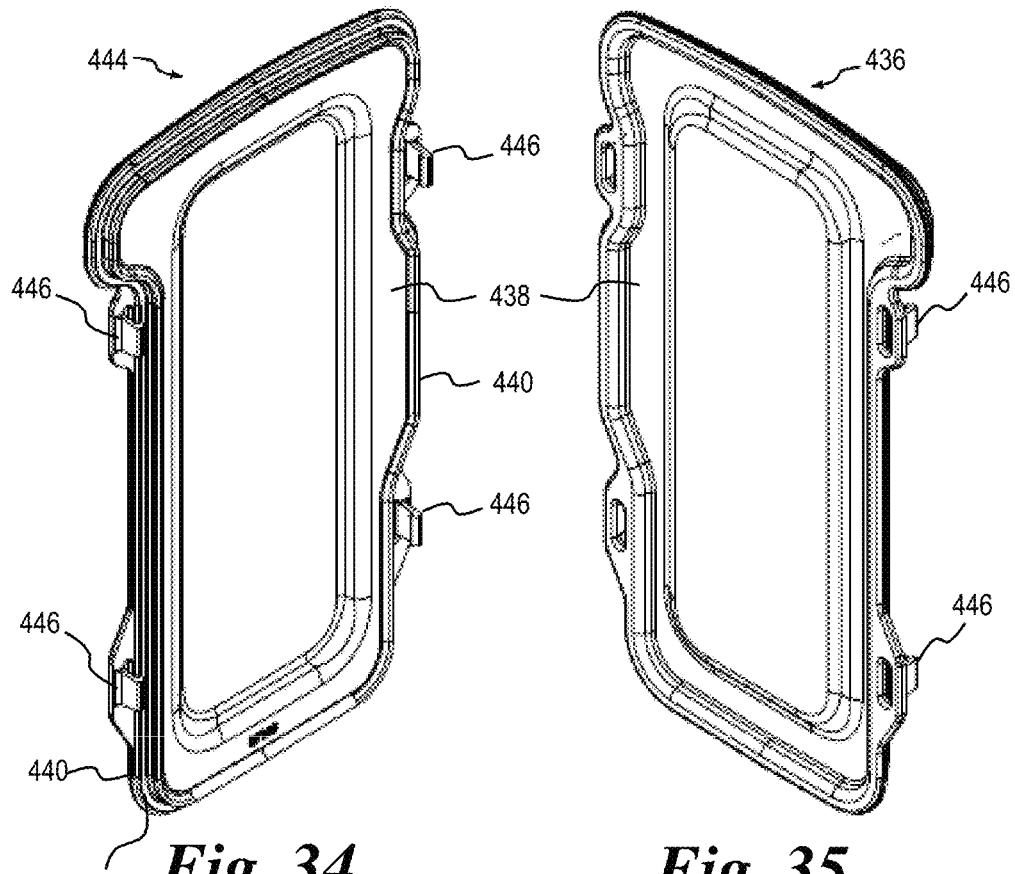
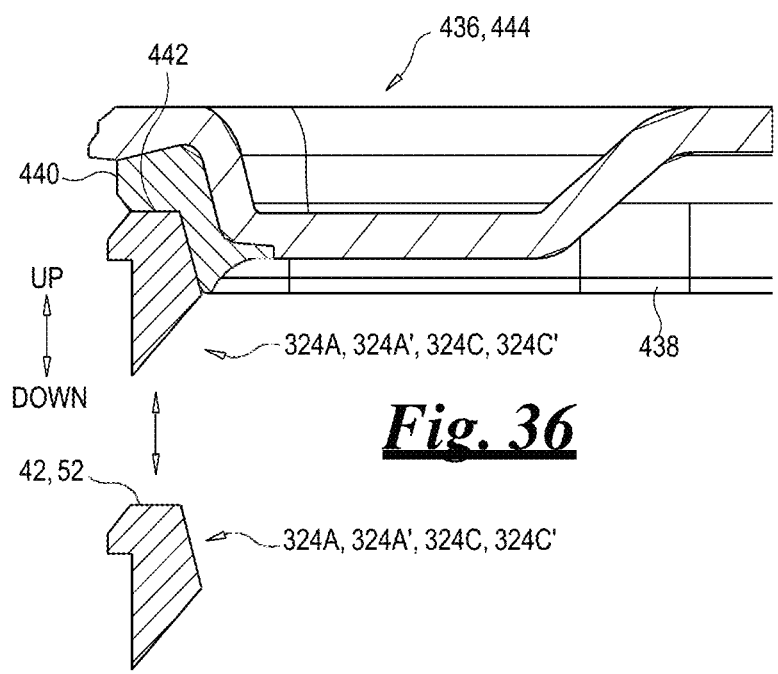

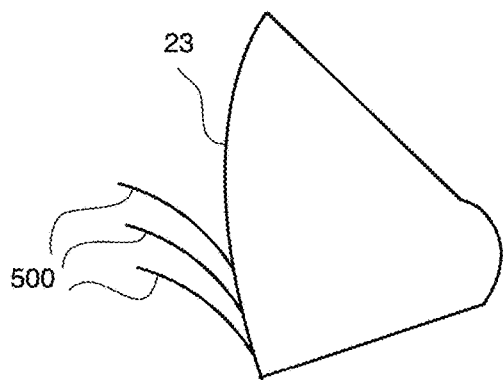 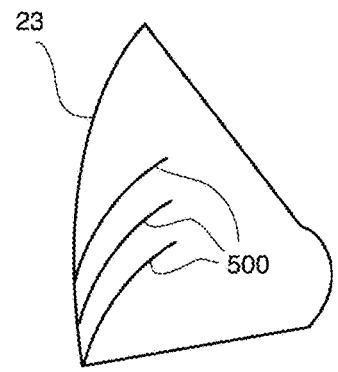
*Fig. 37A*  *Fig. 37B*
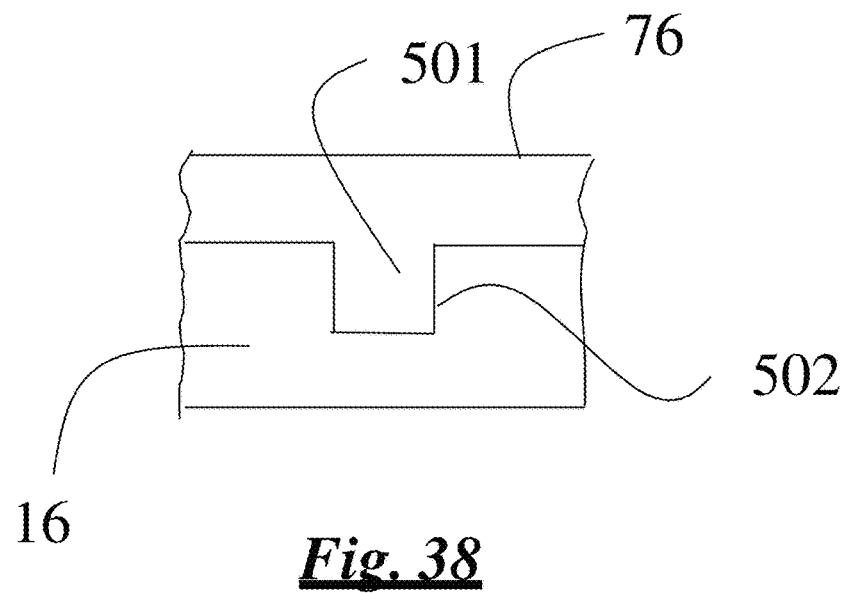
*Fig. 38*

EXPANDLE GRAVITY-FEED BIN

This application is a continuation-in-part of U.S. patent application Ser. No. 15/050,035, filed Feb. 22, 2016, which is a continuation-in-part of U.S. patent application Ser. No. 14/281,502, filed May 19, 2014, which is a continuation-in-part of U.S. patent application Ser. No. 14/148,396, filed Jan. 6, 2014, which claims priority to U.S. provisional application 61/749,311, filed Jan. 5, 2013, the contents of each of these applications being incorporated by reference herein.

FIELD

The present invention relates generally to a bulk-product inventory dispensing apparatus and, more particularly, to a gravity-feed dispensing apparatus with an expandable reservoir.

BACKGROUND

Gravity-feed bins for dispensing bulk-product inventory are used to dispense a wide variety of materials having a range of sizes and aggregate make-ups as diverse as hardware components, for example, nuts and bolts, to retail grocery food, such as pastas, cereals, nuts, coffee (either beans or ground), dried soup mixes, candies, spices, and the like. Generally, a gravity-feed bin is comprised of a hollow hopper-type reservoir enclosure having an inlet at an upper end utilized to fill the enclosure with bulk inventory, an outlet or chute at its lower end utilized to dispense the material, and a flow-control device located intermediate the upper and lower openings and controlled by a manually-actuated gate mechanism. This arrangement, in turn permits manipulation of the amount of inventory being dispensed during the interval the handle or other control device is actuated. In operation, as the inventory is being dispensed, the force of gravity causes the portion stored above in the reservoir to progressively migrate towards the lower end to replace the void left as portions of the inventory are dispensed. These types of bins generally include a downwardly angled or curving floor within the cavity that forms a slide to channel the stored inventory into a receptacle downstream from the outlet gate.

An alternate means for dispensing stored bulk inventory is to employ a bulk food dispenser generally known as a "scoop bin." As the name suggests, a scoop bin typically comprises a hollow plastic bin, often having a hinged lid that is lifted to provide the consumer access to the stored contents. A hand scoop is then employed to gather the bulk product for placement into a container. While scoop bins are effective for dispensing a wider variety of product than a gravity type dispenser, they suffer from several major disadvantages, particularly in the area of hygiene, because of the contamination that can take place in these types of dispensers. Sources of contamination include germs that may be attached to the scoop or scoop handle being transferred to the stored product during dispensing or from external debris falling into the bin cavity when the bin's lid is lifted. Lastly, since the nature of scoop bins requires their openings to be located closer to the floor for access reasons, they are generally within the reach of children and others who are not hesitant to reach into the unsecured bins with potentially unclean hands in order to extract a sample, or even play with the bin contents. In addition, scoop bins also suffer from inventory shrinkage, both from pilferage and from accidental spillage.

As can be appreciated from the foregoing discussion, gravity-feed bins offer a multitude of advantages compared to other dispensing means, such as scoop bins, including convenience, ease of use and hygiene. Heretofore, gravity-feed bins have been provided with a reservoir having one of several fixed capacities. This limits the quantity of bulk inventory that is available for dispensing, particularly if the bulk inventory to be dispensed is relatively large or is a popular item. As a result, such inventory may be rapidly depleted. There is a need for a way to conveniently and cost-effectively tailor the storage capacity of a gravity-feed bin to the type of material being dispensed, and to the level of demand for the product.

SUMMARY

An expandable sectional gravity-feed bin is disclosed according to several embodiments of the present invention. The bin comprises a main bin having a storage reservoir and a dispensing chute. An upper spout is coupled to dispensing chute, and a lower spout is coupled to the upper spout. A handle includes a dispensing gate that selectably closes off an opening in the upper spout or in the dispensing bin. The bin may further include one or more extension sections that are selectably attachable to an open end of the main bin to increase the storage capacity of the reservoir.

In one aspect of the present invention a gravity-feed bin includes a generally hollow main bin that has a storage reservoir and an open end. A first generally hollow extension section is selectably coupled to the open end of the main bin. The first extension section is in communication with the reservoir, and the storage capacity of the reservoir is increased by the first extension section. In some embodiments a seal element is located intermediate the open end of the main bin and the first extension section, the seal element providing a substantially air-tight seal between the main bin and the first extension section. A plurality of extension sections and seal elements may be selectably coupled together in a stacked arrangement upon the first extension section and/or the main bin to further increase the storage capacity of the reservoir.

In another aspect of the present invention a gravity-feed bin comprises a generally hollow main bin that includes a storage reservoir and an open end. The gravity-feed bin further includes a plurality of generally hollow extension sections, each of the plurality of extension sections being configured to be selectably coupled to an immediately adjacent extension section, and a select one of the plurality of extension sections being configured to be selectably coupled to the open end of the main bin. The plurality of extension sections are in communication with the reservoir and form a stacked arrangement having a cumulative volume corresponding to the sum of the extension sections. The gravity-feed bin further includes a plurality of seal elements, a seal element located intermediate each of the immediately adjacent extension sections and a select seal element being intermediate the main bin and the select one of the plurality of extension sections immediately adjacent to the main bin. The storage capacity of the reservoir is selectively increased by the sum of the plurality of extension sections. Furthermore, the plurality of seal elements provide a substantially air-tight seal between the immediately adjacent extension sections.

In a further aspect of the present invention a gravity-feed bin comprises a generally hollow main bin that includes an open end, a storage reservoir and a dispensing chute having an opening disposed near a distal end thereof. The gravity-feed bin further includes a gate configured to move between open and closed positions, the gate configured to block the opening when the gate is in the closed position. The gravity-feed bin also includes a sealing gasket and a gate seal. The open end is configured for selectable secure coupling to a gasket lid and for selectable engagement of the sealing gasket against the gasket lid. The opening of the dispensing chute configured to selectably engage the gate seal against the gate when the gate is in the closed position. The sealing gasket and gate seal operating to provide a substantially air-tight seal of the gravity-feed bin when engaged.

In a further aspect of the present invention, the main bin includes a vertical front wall joined to planar first front surface that is disposed below the vertical front wall, at an angle relative to the vertical front wall so as to direct bulk material inwardly towards the interior of the storage reservoir. A second planar front surface is joined to the first front surface, and disposed at an angle relative to the first front surface, so as to direct the bulk material towards the dispensing chute.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 31 and 32 are front and rear perspective views of a gasket lid of a non-agitation type gravity-feed bin according to yet another embodiment of the present invention;

FIG. 33 is a side elevational view of the gasket lid of FIG. 31;

FIGS. 34 and 35 are front and rear perspective views of a gasket lid of an agitation type gravity-feed bin according to yet another embodiment of the present invention;

FIG. 36 is a partial view in section of the gasket lid of FIG. 31 shown with a partial view in section of a connector;

FIG. 37A is a partial view in section depicting gate 23 and fins 500 in one aspect of the invention;

FIG. 37B is a partial view in section depicting gate 23 and fins 500 another aspect of the invention; and FIG. 38 depicts a fragmentary sectional view of chute 16 and seal 76.

DETAILED DESCRIPTION

Figure 1:
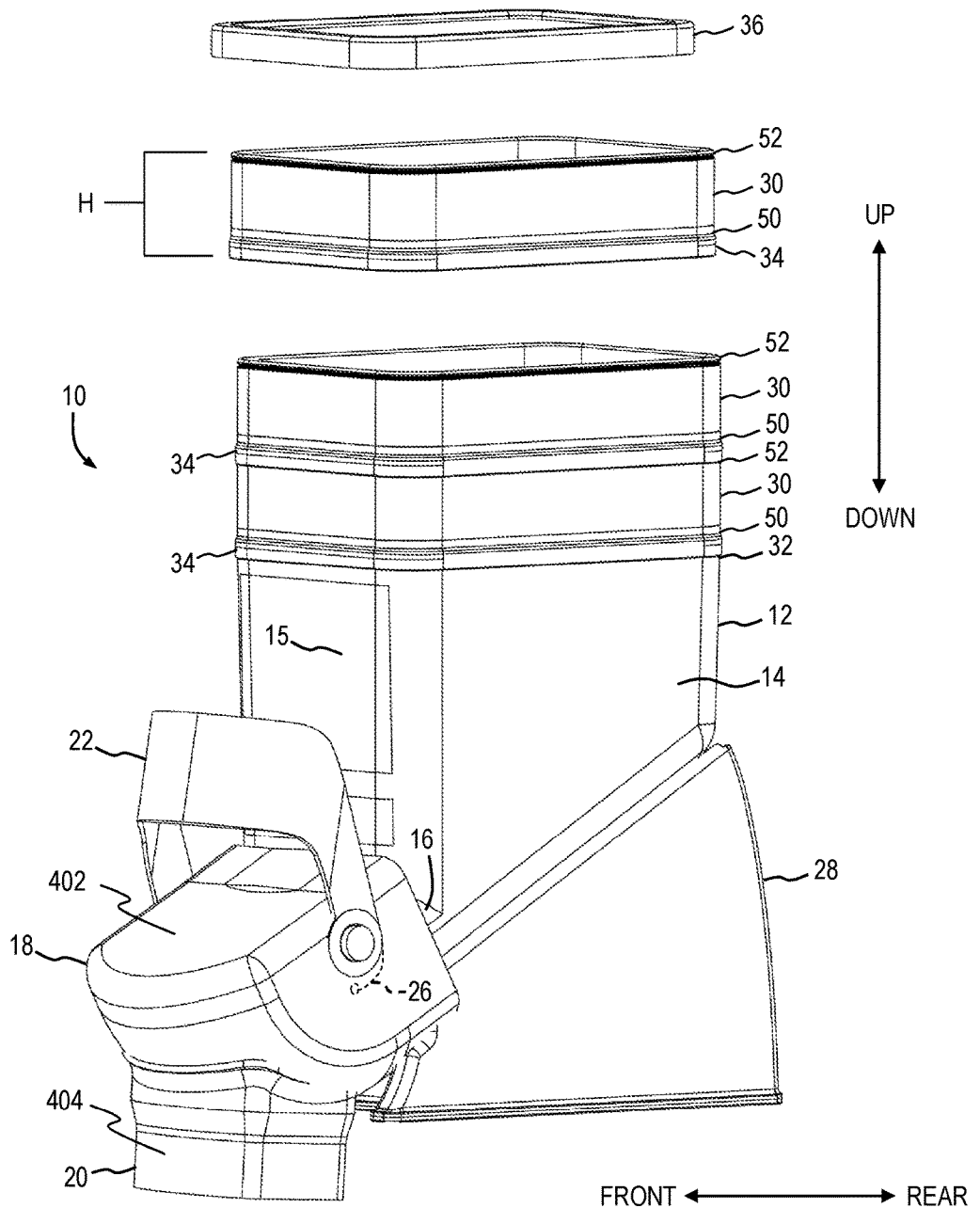
FIG. 1 is an exploded view showing the general arrangement of an expandable gravity-feed bin according to an embodiment of the present invention.
Figure 2A:
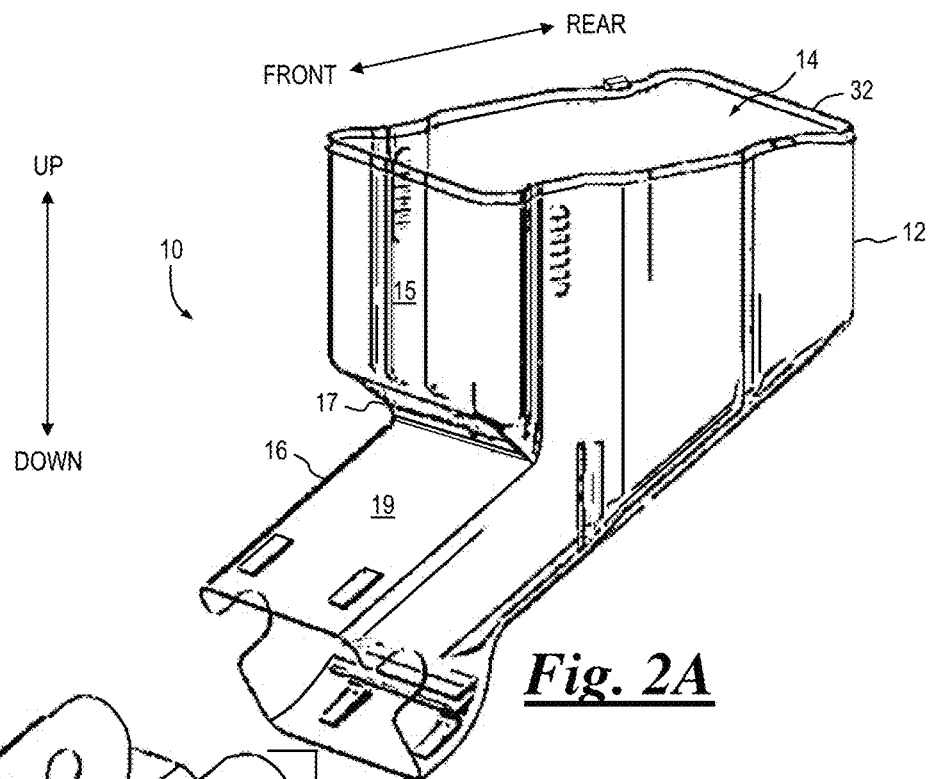
FIG. 2A is an exploded view showing certain components of the bin of FIG. 1.
Figure 2B:
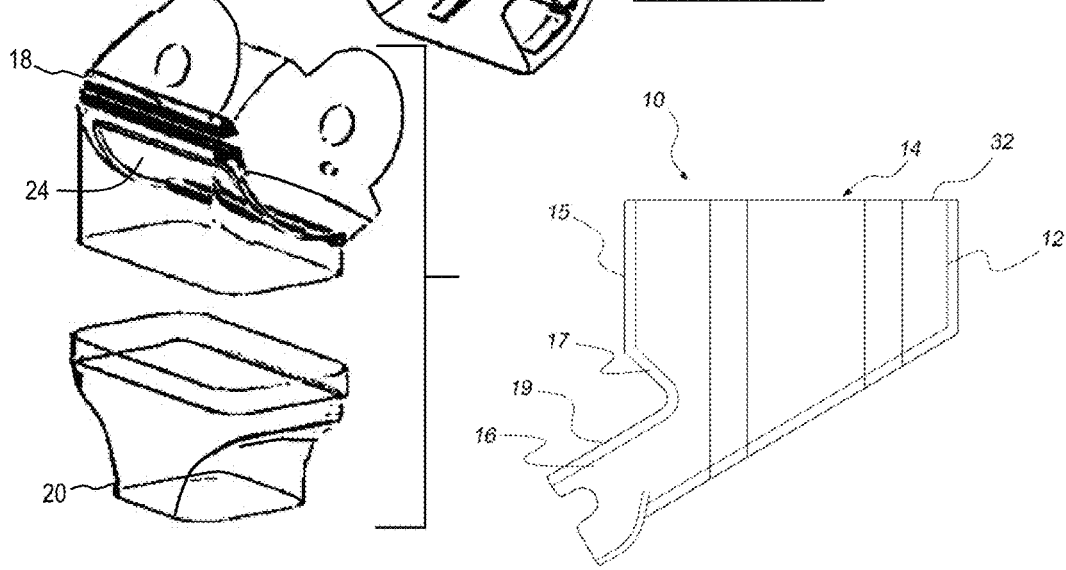
FIG. 2B is a side elevation view of the main bin and dispensing chute of FIG. 2A.

The general arrangement of a selectably expandable gravity-feed bin 10 is shown in FIGS. 1 and 2 according to an embodiment of the present invention. Bin 10 comprises a generally hollow main bin 12 having a storage reservoir 14 and a generally hollow dispensing chute 16. A generally hollow spout may be in communication with reservoir 14. For example, in the bin 10 of FIGS. 1 and 2 a generally hollow upper spout 18 is coupled to dispensing chute 16, and a generally hollow lower spout 20 is coupled to the upper spout. As shown in FIG. 1, the upper spout 18 has an exterior surface 402 that projects outwardly from the vertical front wall 15 of main bin 12. As shown in FIG. 1, the exterior surface 402 is downwardly angled and thus has horizontal (outward) and vertical (downward) aspects. A lower spout 20 has an exterior surface 404 adjacent to the exterior surface 402 of the upper spout 18. As shown in FIG. 1, the exterior surface 404 of the lower spout 20 is substantially vertically (downward) oriented and disposed horizontally outwardly from the vertical front wall 15. The lower spout 20 is substantially downwardly oriented. A handle 22 is coupled to a dispensing gate 23 (FIG. 11) that selectably closes off an opening 24 in upper spout 18. A biasing element 26 coupled to handle 22 urges the handle and dispensing gate 23 into a closed position with the dispensing gate substantially closing off opening 24. A selectably removable cover 27 (FIGS. 10, 13) may optionally be used to at least substantially enclose biasing element 26. Main bin 12 may be attached to a base 28, or may be attached to a not-shown display rack, shelf or table.

Biasing element 26 may be any suitable component (or components) for urging and maintaining handle 22 and dispensing gate 23 in the closed position when not in use. As non-limiting examples, biasing element 26 may be made from natural or synthetic rubber, or other elastic material. Biasing element 26 may also be one or more springs. Example spring types may include, without limitation, a tension spring, compression spring and torsion spring. The spring may be formed in any convenient shape, such as a helical coil spring, flat spring and leaf spring, among others. The spring may be made from any suitable materials including, without limitation, metal, plastic and composites.

To operate bin 10, a user grasps handle 22 and moves the handle against the bias exerted by biasing element 26, causing dispensing gate 23 to move away from opening 24. Product stored in reservoir 14 of bin 10, such as bulk materials, is urged downwardly by gravity and is dispensed through dispensing chute 16. In some embodiments, the product is further urged downwardly through opening 24, upper spout 18 and lower spout 20. When a desired amount of material has been dispensed, the user releases handle 22, thereby urging the handle back to the closed position, with dispensing gate 23 again closing off opening 24.

Bin 10 includes main bin 12. The front of main bin 12 includes a vertical front wall 15 joined to a first front surface 17. First front surface 17 is planar (i.e. straight, flat, and linear). First front surface 17 is disposed below front wall 15, and positioned at an angle relative to front wall 15 so as to direct product inwardly toward the interior of reservoir 14. First front surface 17 is joined to second front surface 19, such that first front surface 17 is intermediate front wall 15 and second front surface 19. Second front surface 19 is planar (i.e. straight, flat, and linear), and disposed at an angle, relative to first front surface 17, so as to direct product out of the interior of reservoir 14 towards dispensing chute 16. In some embodiments, main bin 12 is formed from two halves; thus, front wall 15, first front surface 17, and second front surface 19 are formed from two separate pieces. In another embodiment, main bin 12 is formed from a unitary piece of material. In some embodiments, an agitator is incorporated consistent with the teachings found elsewhere herein; e.g. agitator 74, shown in FIG. 19 and accompanying discussion.

In a first embodiment of the present invention bin 10 may further include one or more generally hollow extension sections 30. As shown generally in FIG. 1, a first extension section 30 is selectably coupled to an open end 32 of main bin 12 and is in communication with reservoir 14 to increase the storage capacity of the reservoir. Preferably, a seal element 34 is located intermediate open end 32 of main bin 12 and an adjacent extension section 30.

In some embodiments of the present invention a plurality of extension sections 30 may be selectably coupled to main bin 12 in a stacked arrangement. In this arrangement a second extension section 30 is selectably coupled to the first extension section, a third extension section is selectably coupled to the second extension section, and so on to increase the storage capacity of reservoir 14 by a desired amount. Preferably, a seal element 34 is provided intermediate each immediately adjacent extension sections 30. Seal element 34 preferably provides a substantially air-tight seal between adjoining elements.

A sealing lid 36 selectably engages the uppermost extension section 30 and substantially closes off a second edge 52 of the uppermost extension section. Preferably, sealing lid 36 also provides a substantially air-tight seal of the uppermost extension section 30.

Extension sections 30 may be any suitable dimensions. As non-limiting examples, in various configurations the extension sections 30 may have a height "H" (FIG. 1) of about 2 inches or about 3 inches, though greater and lesser height dimensions are envisioned within the scope of the invention. Extension sections 30 may be of the same height or of varying heights in a stackup of extension sections.

Figure 3:
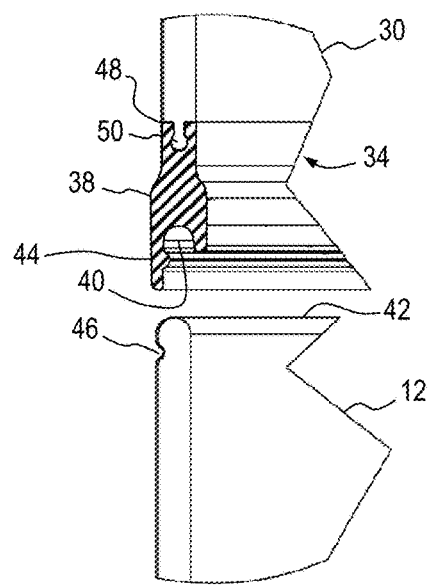
FIG. 3 is a partial view in section showing details of a sealing element of the bin of FIG. 1.

With continued reference to FIG. 1, details of an example seal element 34 are shown in FIG. 3 according to an embodiment of the present invention. Seal element 34 includes a seal body 38. A first, generally U-shaped receptacle 40 is configured to receive an edge 42 of main bin 12. Seal element 34 may further include one or more lips 44 that are adapted to engage a corresponding groove or slot (hereafter generally "groove") 46 of edge 42 of main bin 12. An opposing, second receptacle 48 of seal element 34 is generally keyhole-shaped to correspond to the shape of a first edge 50 of extension section 30. The second, opposing edge 52 of extension section 30 may be shaped similar to edge 42 of main bin 12.

Figure 4:
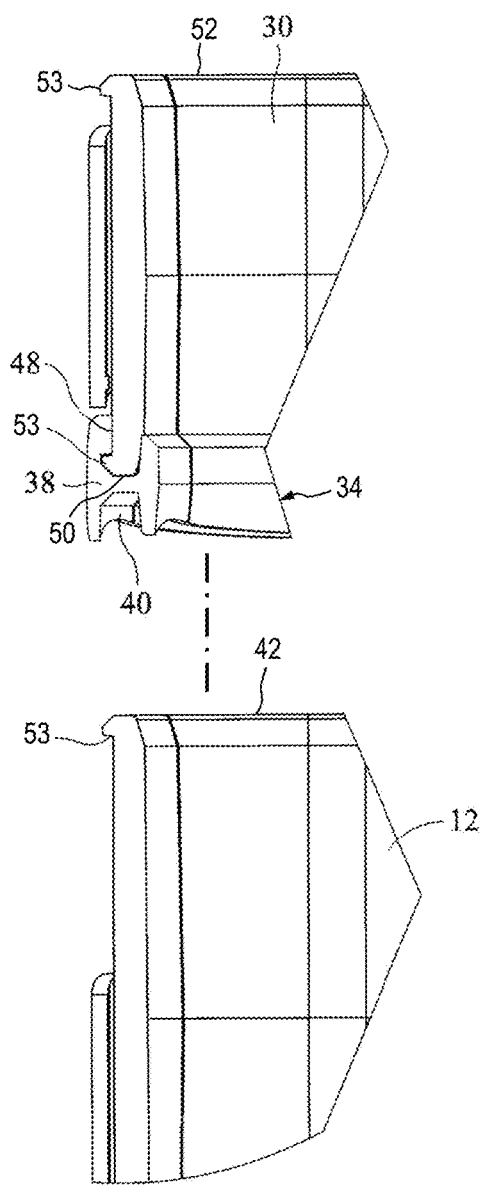
FIG. 4 is a partial view in section showing details of a sealing element of the bin of FIG. 1 according to an alternate embodiment of the present invention.

It should be noted that the shape of seal element 34 may be varied as desired to conform to edges 42, 50 and 52. Furthermore, edges 42, 50 and 52 may be varied in shape as desired to suit a particular bin 10. For example, a seal element 34 according to an alternate embodiment is shown in FIG. 4. In this embodiment seal element 34 includes a first receptacle 40 that is shaped to receive edge 42 of main bin 12 and/or second edge 52 of an extension section 30. Likewise, a second, opposing receptacle 48 is shaped to receive a first edge 50 of an extension section 30. Furthermore, any or all of edges 42, 50 and 52 may be shaped to include a flanged portion 53 corresponding to the shape of receptacles 40, 48.

In some embodiments seal element 34 is a separate component that is coupled to main bin 12 and extension sections 30. In other embodiments seal element 34 may be made integral with either or both of main bin 12 and extension sections 30 by any suitable process, such as overmolding. Seal element 34 may be made from any suitable elastomeric, resilient material including, without limitation, plastic and rubber.

Figure 5:
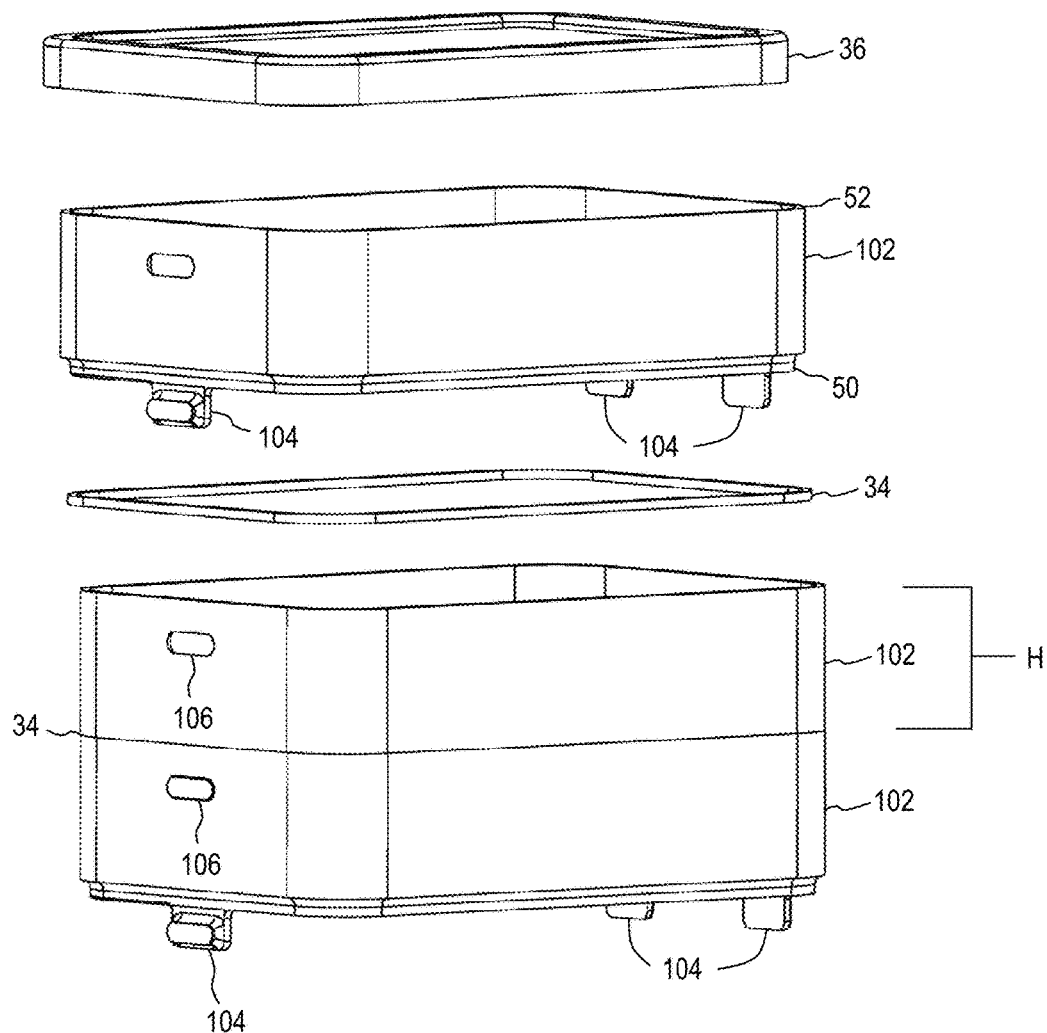
FIG. 5 is an exploded view showing the general arrangement of a plurality of extension sections according to another embodiment of the present invention.
Figure 6:
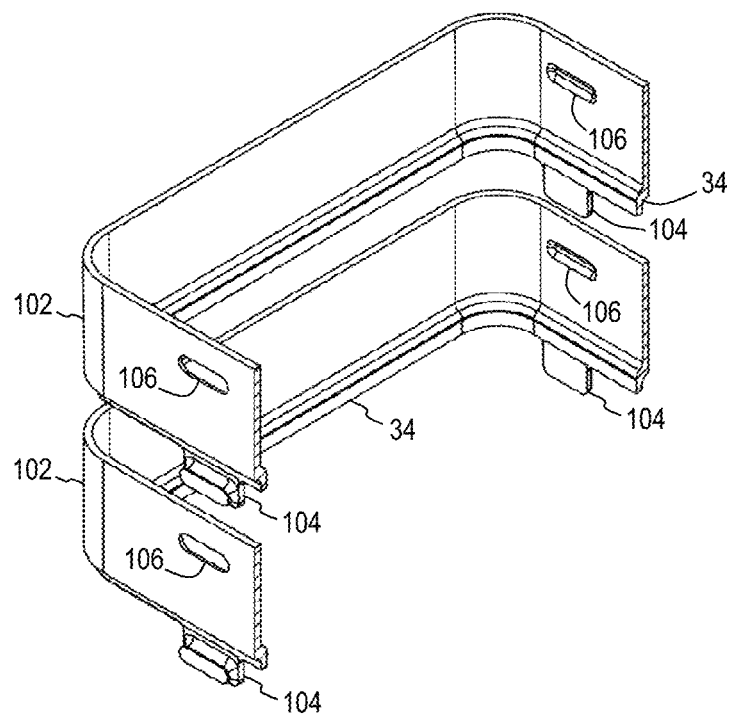
FIG. 6 is an exploded, partial view in section of the extension sections of FIG. 5.

In another embodiment of the present invention, shown in FIGS. 5 and 6, one or more extension sections 102 may be selectably attached to reservoir 14. In this embodiment extension sections 102 each include one or more tabs 104 configured to fit into a mating slot or indentation (hereafter generally "slot") 106 in an adjacent extension section or in main bin 12.

A seal 34 may be arranged intermediate edge 42 of main bin 12 and the immediately adjacent extension section 102.

Likewise, a seal 34 may be arranged intermediate immediately adjacent extension sections 102, as shown in FIG. 5.

Extension sections 102 may be any suitable dimensions. As non-limiting examples, in various configurations the extension sections 102 may have a height "H" (FIG. 5) of about 2 inches or about 3 inches, though greater and lesser height dimensions are envisioned within the scope of the invention. Extension sections 102 may be of the same height or of varying heights in a stackup of extension sections.

It is understood that the positions of tabs 104 and mating slots or indentations may be reversed from that shown in the figures within the scope of the invention. For example, tabs 104 may extend from main bin 12 to mate with corresponding slots or indentations in an adjacent extension section 102.

Figure 7:
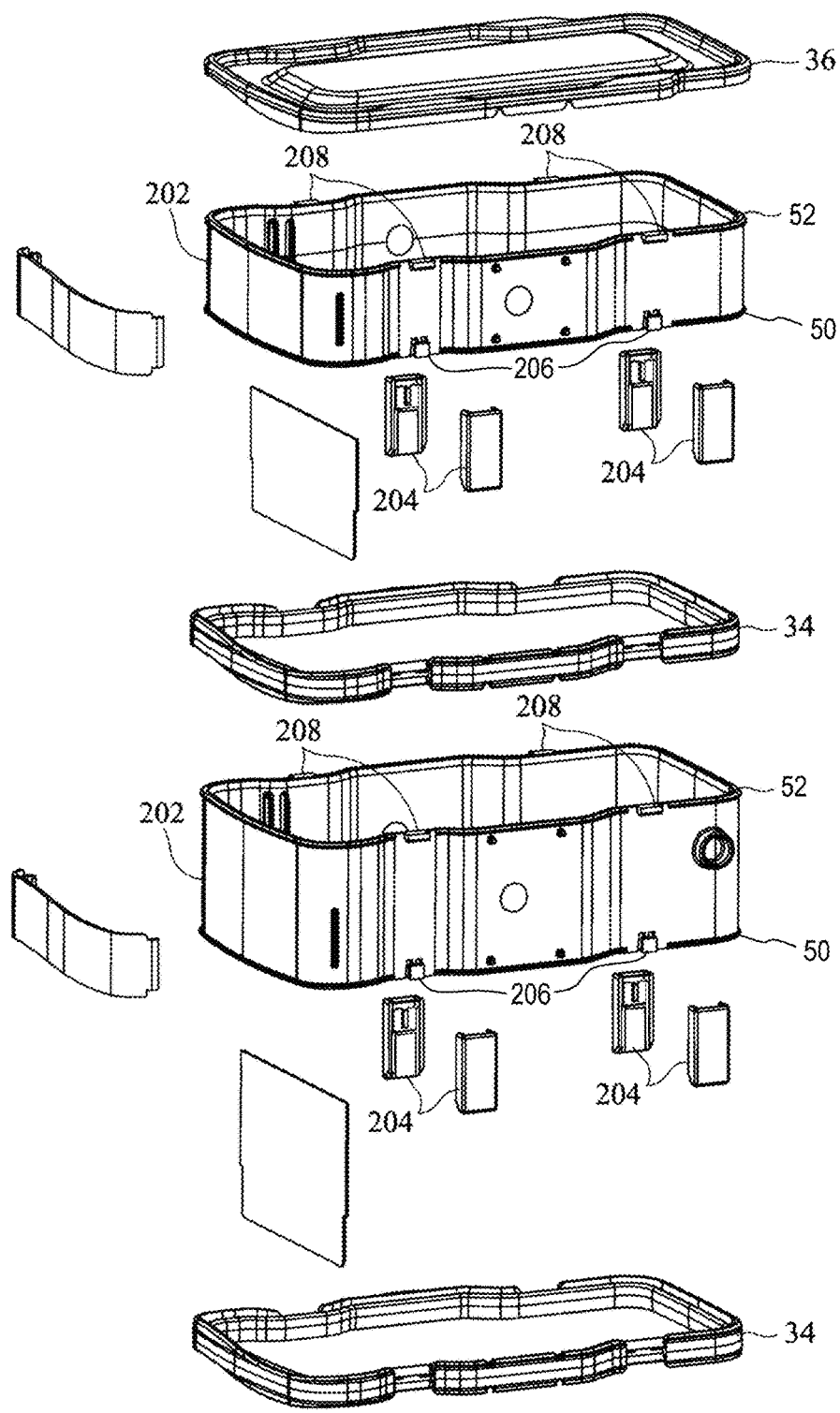
FIG. 7 is an exploded view showing the general arrangement of a plurality of extension sections according to still another embodiment of the present invention.
Figure 8:
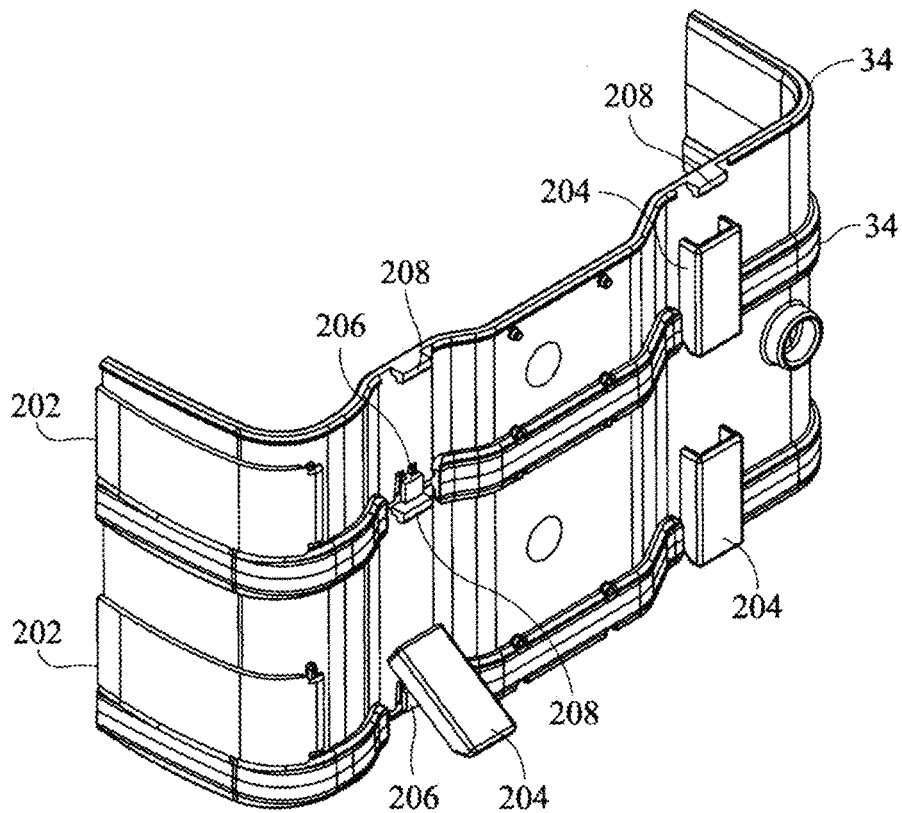
FIG. 8 is a partial view in section of the extension sections of FIG. 7.
Figure 9:
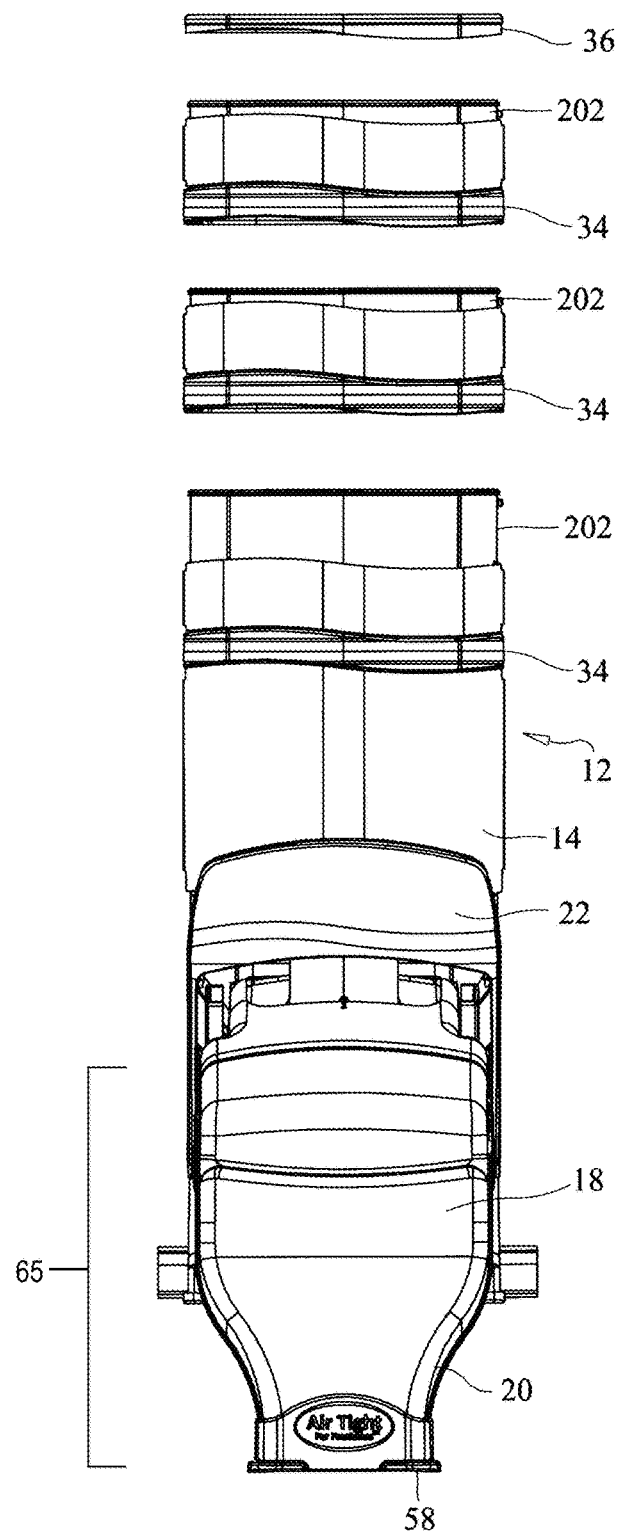
FIG. 9 is a front elevational, exploded view of a gravity-feed bin incorporating the extension sections of FIGS. 7 and 8.

In yet another embodiment of the present invention, shown in FIGS. 7, 8, 9 and 10 one or more extension sections 202 may be selectably attached to reservoir 14. In this embodiment extension sections 202 each include one or more fasteners 204, first protrusions 206 and second protrusions 208. An extension section 202 is selectably coupled to main bin 12 or to an immediately adjacent extension section by locating the extension section upon the main bin (or adjacent extension section, as the case may be) such that corresponding first protrusions 206 and second protrusions 208 are adjacent to one another, as shown in FIG. 8. Fastener 204 is then moved to engage protrusions 206, 208, thereby selectably coupling the extension section 202 to main bin 12 (or to an immediately adjacent extension section).

Figure 10:
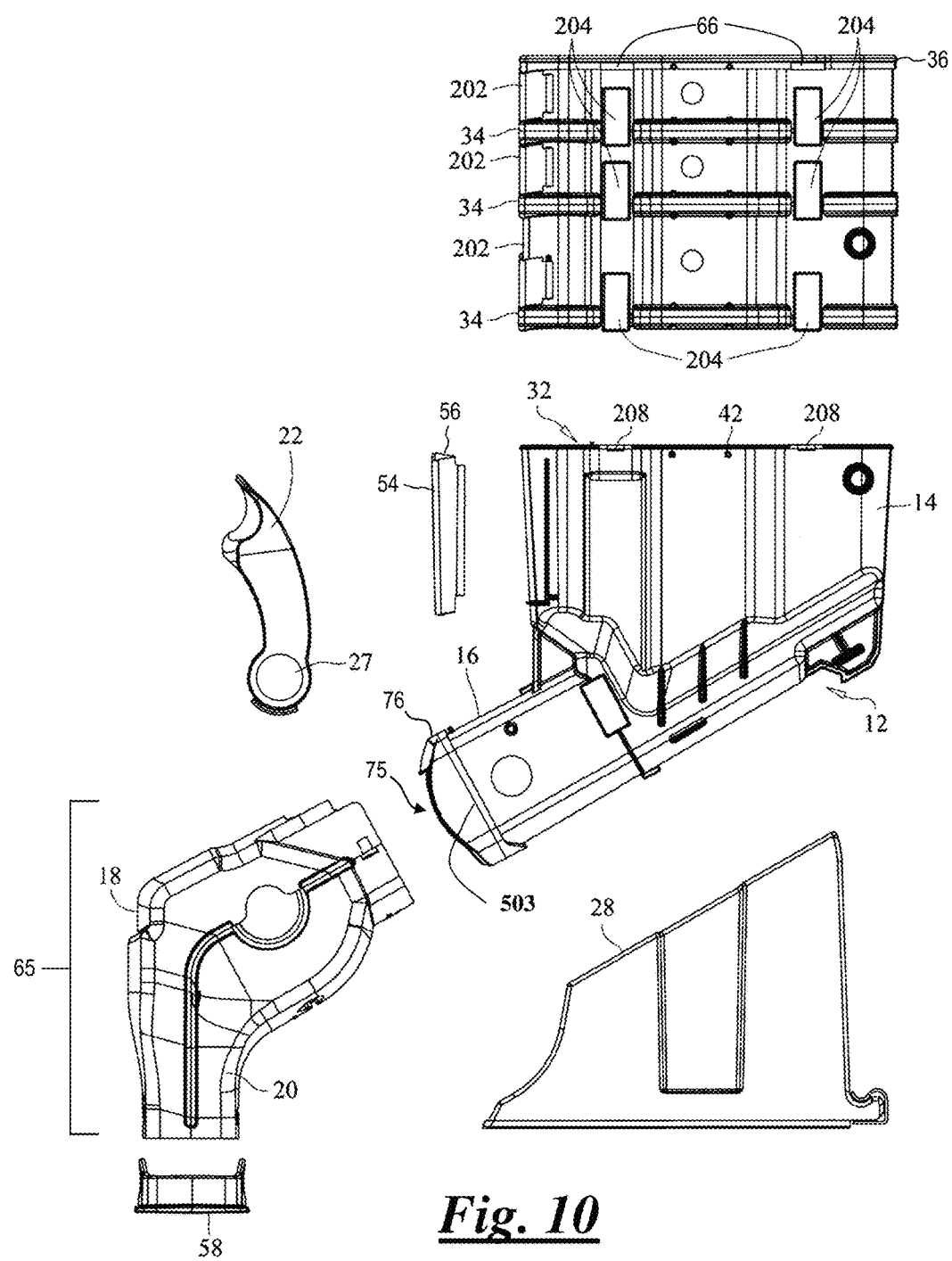
FIG. 10 is a side elevational, exploded view of the gravity-feed bin of FIG. 9.

As shown in FIGS. 7 and 10, a seal 34 may be arranged intermediate edge 42 of main bin 12 and the immediately adjacent extension section 202. Likewise, a seal 34 may be arranged intermediate immediately adjacent extension sections 202.

Extension sections 202 may be any suitable dimensions. As non-limiting examples, in various configurations the extension sections 202 may have a height "H" (FIG. 7) of about 2 inches or about 3 inches, though greater and lesser height dimensions are envisioned within the scope of the invention. Extension sections 202 may be of the same height or of varying heights in a stackup of extension sections.

It is understood that the positions of fasteners 204 and mating protrusions 206, 208 may be reversed from that shown in the figures within the scope of the invention. Furthermore, fasteners 204 may be attached to main bin 12 and/or extension sections 202, or may be separate from the main bin and the extension sections as separate pieces that are attached to protrusions 206, 208.

Figure 11:
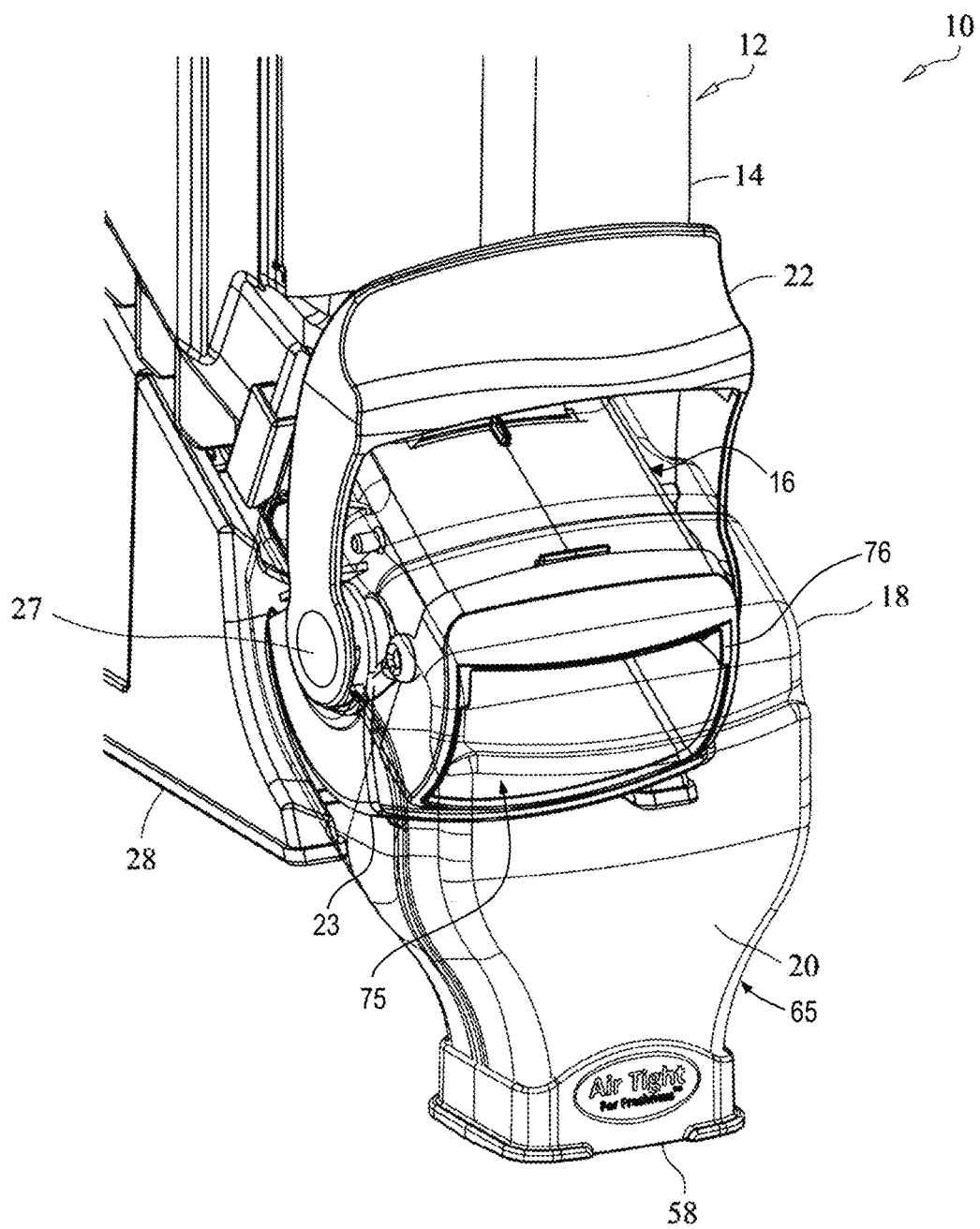
FIG. 11 is a partial perspective view showing further details of the gravity-feed bin of FIG. 9.
Figure 12:
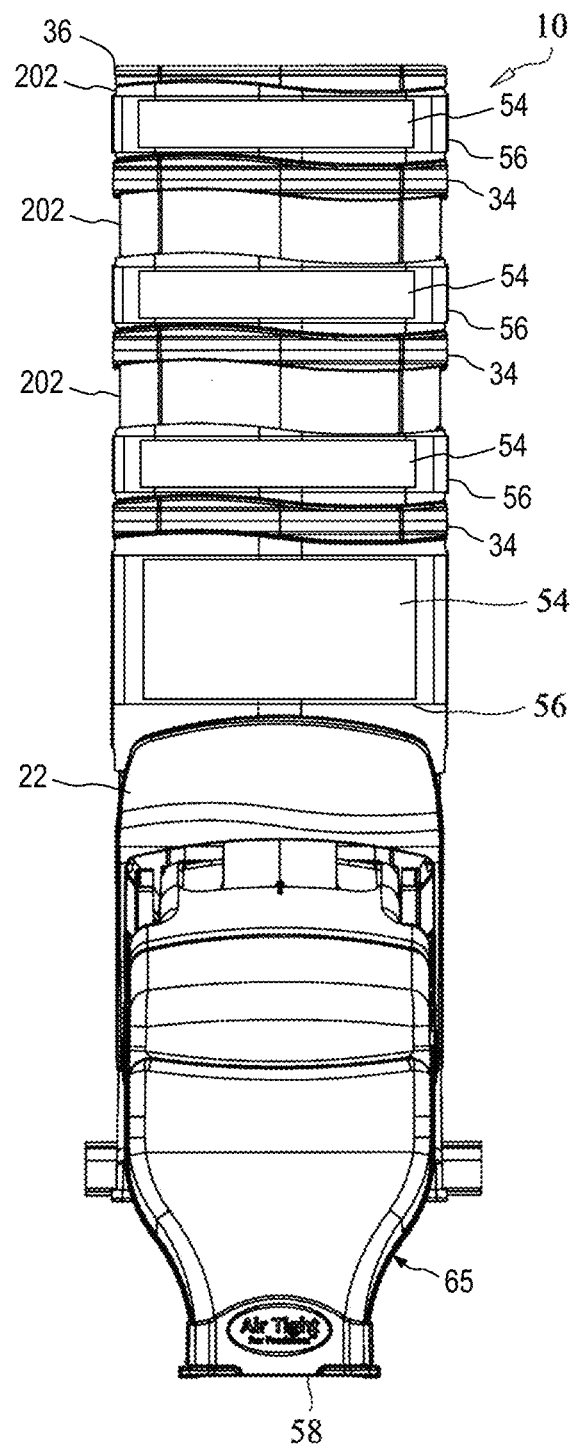
FIG. 12 is a front elevational view of the gravity-feed bin of FIG. 9.
Figure 13:
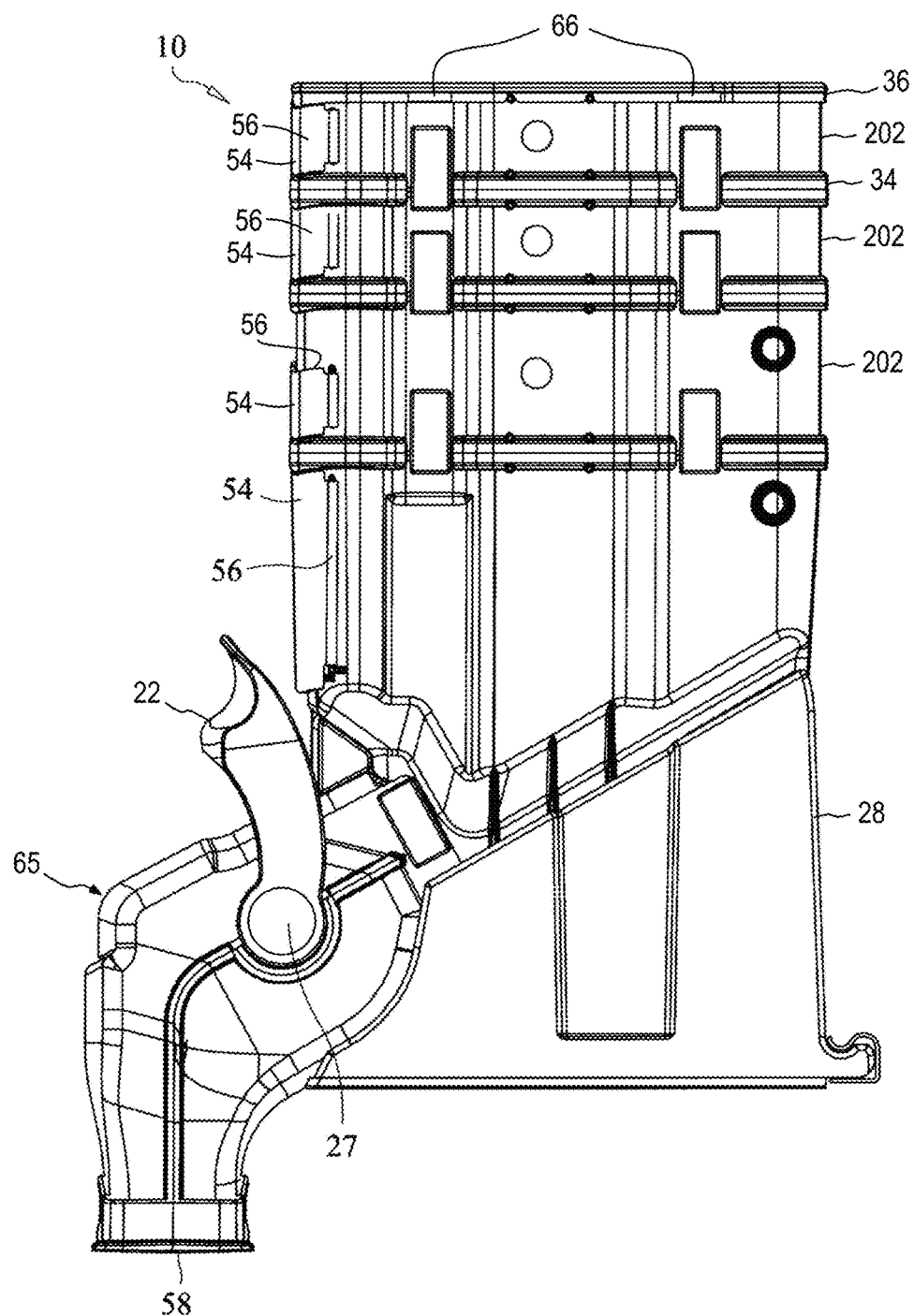
FIG. 13 is a side elevational view of the gravity-feed bin of FIG. 9.

FIGS. 11 through 13 show further details and features of a bin 10. For example, bin 10 may include one or more labels 54 that are selectably or permanently affixed to a label holder 56, as shown in FIGS. 12 and 13. Any or all of extension sections 30, 102, 202 may likewise include one or more labels 54 that are selectably or permanently affixed to a label holder 56, as generally shown in FIGS. 12 and 13. For the sake of clarity FIG. 11 is shown with handle 22 in a "closed" position for dispensing product from bin 10, while gate 23 is shown in an "open" dispensing position.

In addition, lower spout 20 may include a selectably detachable or permanently-attached bag-grip element 58, as shown in FIGS. 12 and 13. In some embodiments bag-grip element 58 is made from a soft or medium durometer material.

Figure 14:
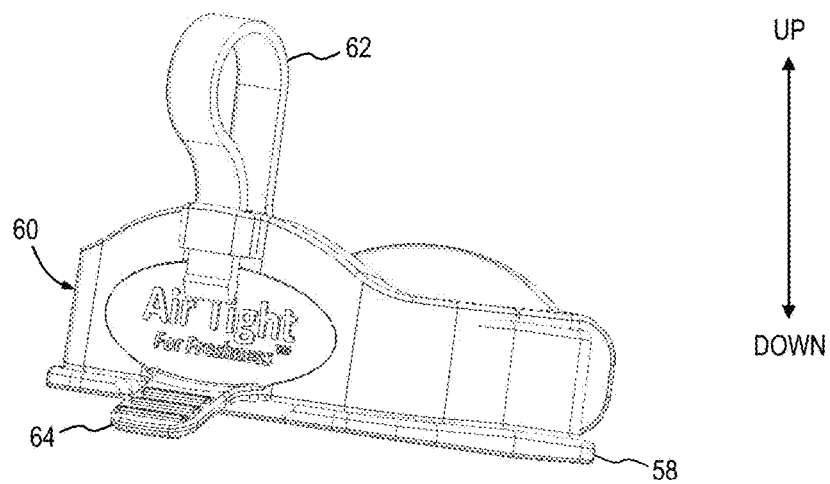
FIG. 14 shows a bag-grip element according to an embodiment of the present invention.
Figure 15:
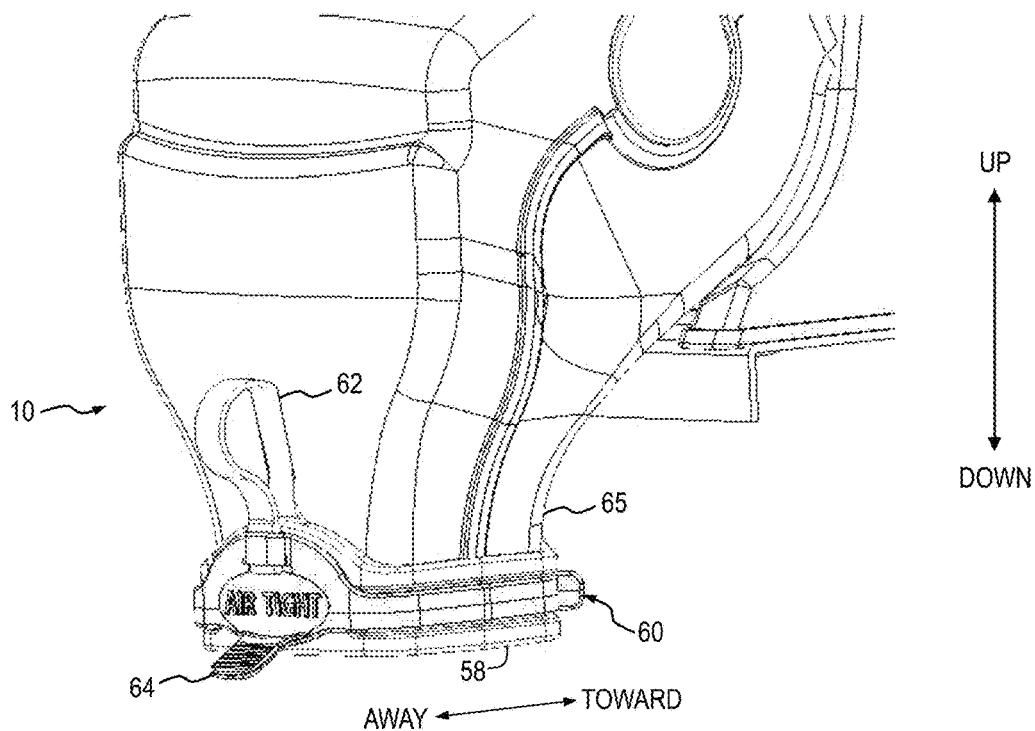
FIG. 15 shows the bag-grip element of FIG. 14 attached to a gravity-feed bin according to an embodiment of the present invention.

With reference to FIGS. 14 and 15, in still further embodiments of the present invention a bag retainer 60 may optionally be utilized in conjunction with a bag-grip element 58. Bag retainer 60 is preferably generally "C"-shaped and is preferably sufficiently flexible to selectably engage bag grip element 58. A strap 62 may optionally be extended between bag grip element 58 and bag retainer 60 to permanently or selectably attach the bag retainer to the bag grip element. Bag retainer 60 may further include a tongue 64 extending therefrom.

Figure 16:
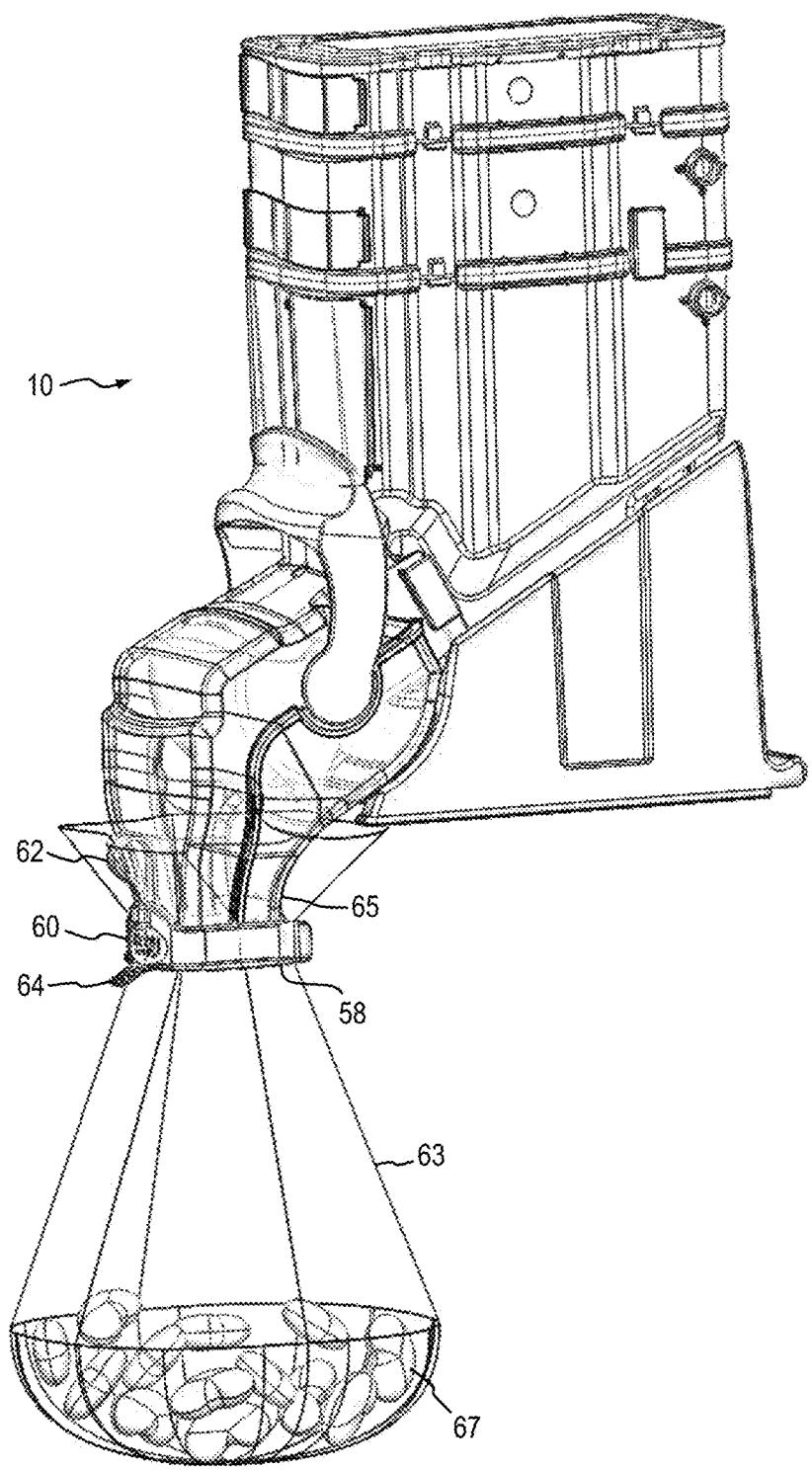
FIG. 16 shows the bag grip element of FIGS. 14 and 15 in use.

With reference now to FIG. 16, in use of bag retainer 60 a user grasps tongue 64 and urges (i.e., pulls) the bag retainer away from bag grip element 58, then places an open end of a bag 63 over the bag-grip element such that the interior of the bag is in communication with a spout 65 (detailed below) of bin 10. Bag retainer 60 is then urged toward (i.e., against) bag-grip element 58, causing the bag retainer to expand slightly to engage and selectably couple to the bag-grip element, thereby trapping the bag between the bag retainer and the bag grip element. The bag is thus secured to bin 10 and is ready to receive product 67 dispensed from the bin. After a desired amount of product has been dispensed from the bin into the bag and the bag is ready for removal from bin 10 the user grasps tongue 64 and again urges bag retainer 60 away from bag-grip element 58 to release the bag from the bag-grip element.

In some embodiments of the present invention upper spout 18 and lower spout 20 may be a single component, such as a spout 65, shown in FIG. 15. Spout 65 may be formed by assembling or joining together upper spout 18 and lower spout 20. Alternatively, spout 65 may be formed as a single integral, unitary piece. Spout 65 is in communication with dispensing chute 16 and is configured to dispense the bulk material through an outlet. Spout 65 is further configured to receive and enclose a substantial portion of dispensing chute 16.

The various components of bin 10 discussed above may be made from any suitable materials such as, without limitation, plastic, metal, composites and rubber. Preferably, the bin may be made of National Sanitation Foundation (NSF) certified polycarbonate or copolyester. The components may be produced using any suitable process, such as molding and machining, among others. Some of the components of bin 10 may be opaque and/or translucent or generally clear, as desired. The components may be finished if desired, such as with molded-in colors, paint, plating, or may be left unfinished.

In some embodiments lid 36 may optionally include one or more recesses 66 (FIG. 10) to aid a user in grasping the lid for removal.

Figure 17:
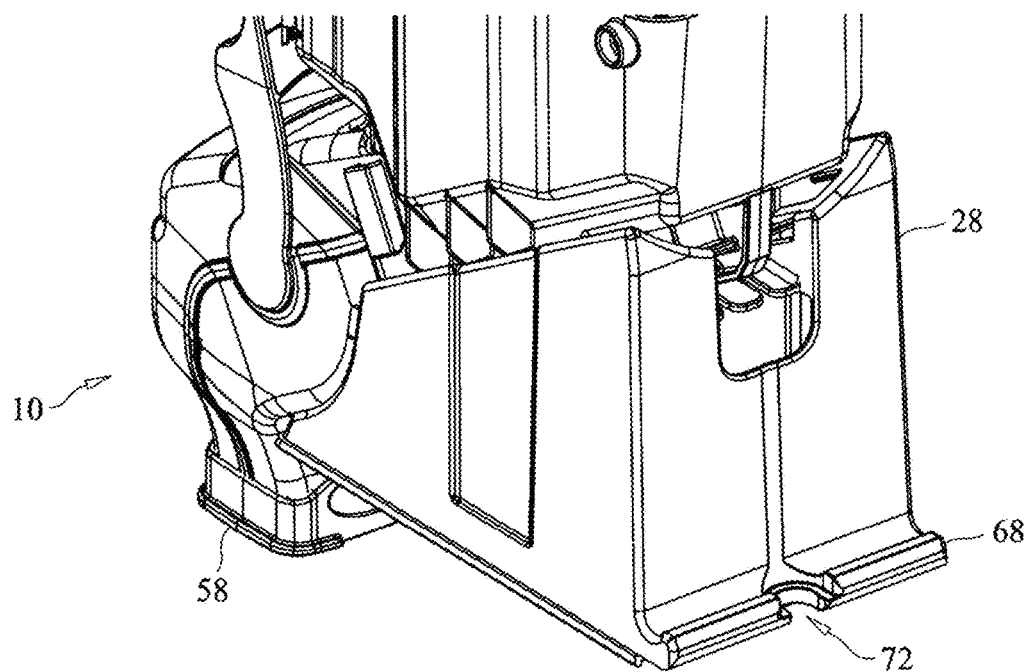
FIG. 17 is a partial rear view of a gravity-feed bin showing details of mounting features according to an embodiment of the present invention.
Figure 18:
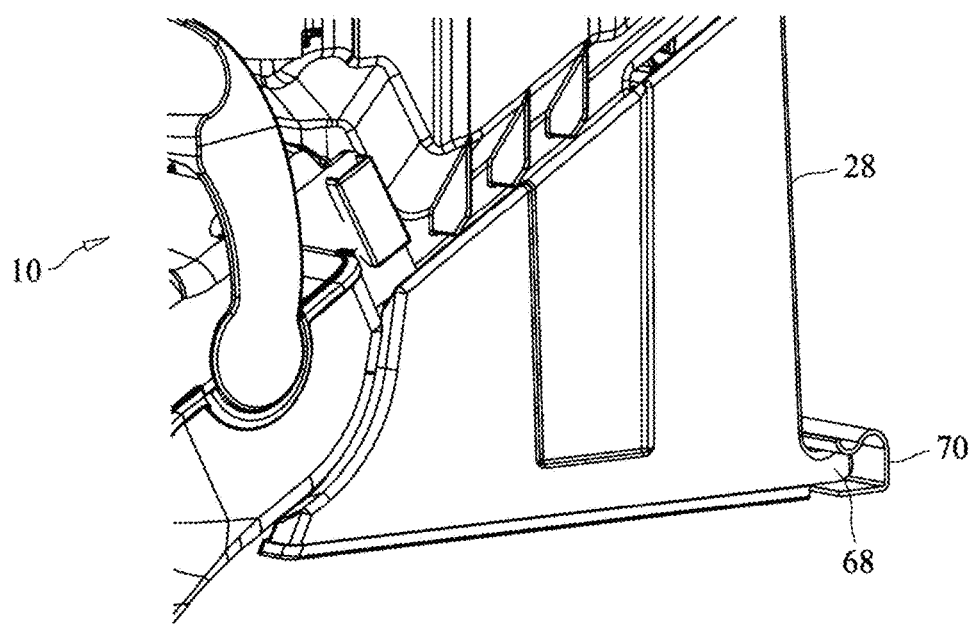
FIG. 18 is a partial side view of the gravity-feed bin of FIG. 17, showing the bin attached to a retainer according to an embodiment of the present invention.

With reference now to FIGS. 17 and 18, in some embodiments of the present invention base 28 may include retaining or fastening devices to selectably secure bin 10 to a display assembly such as a rack, shelf or table. For example, base 28 may have a flange 68 formed integral therewith or made separately and joined or coupled thereto. Flange 68 may be shaped to selectably engage a retainer strip 70, which may in turn be secured to the display assembly. When flange 68 engages retainer strip 70 the base 28 (and thus bin 10) is secured to deter undesired movement of the bin, particularly when a user is dispensing product from the bin. Similarly, base 28 may include one or more anchoring attachment tabs, recesses or apertures 72 through which a not-shown fastening device is inserted to selectably secure the base to the display assembly.

Figure 19:
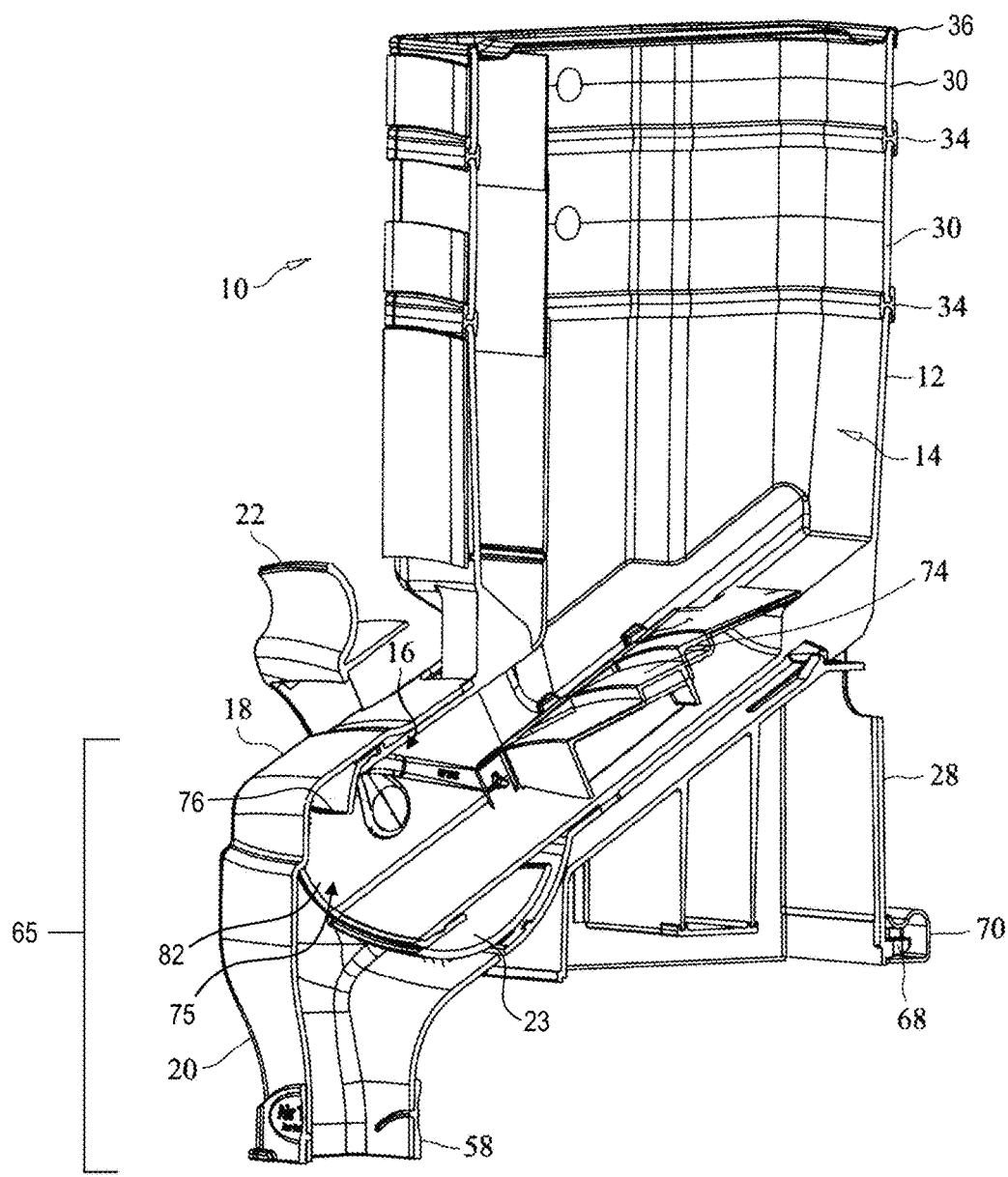
FIG. 19 is a cutaway view of a gravity-feed bin according to yet another embodiment of the present invention.
Figure 21:
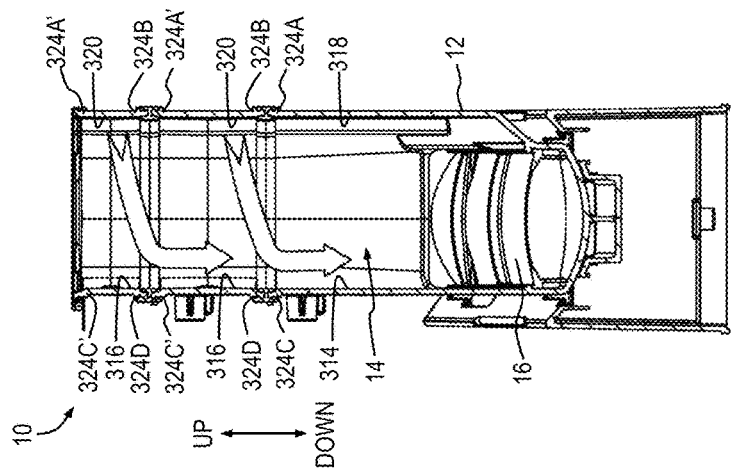
FIG. 21 is a view in section of the gravity-feed bin of FIG. 20
Figure 20:
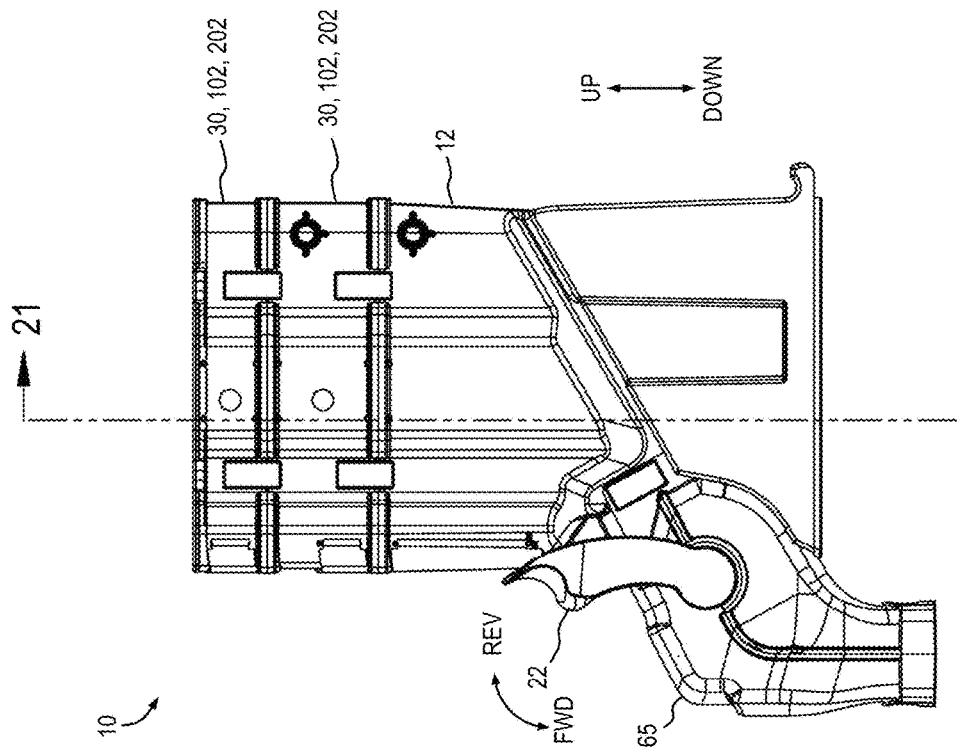
FIG. 20 is a side elevational view of a gravity-feed bin according to still another embodiment of the present invention.
Figure 22:
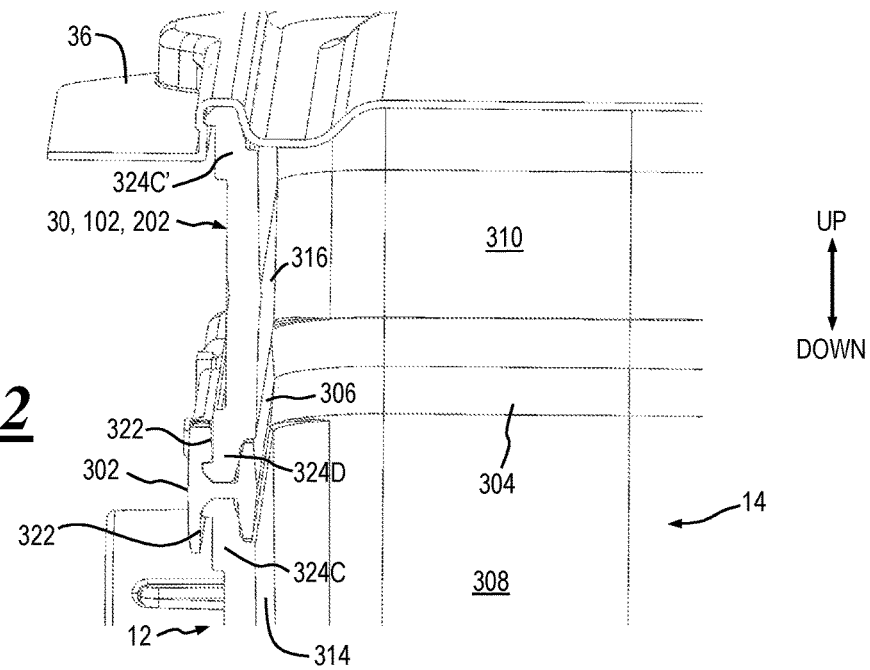
FIG. 22 is a first partial expanded view of a seal element according to an embodiment of the present invention.

Some types of product stored in gravity-feed bin 10 may have various combinations of sizes, shapes and surface characteristics that render the product difficult to dispense. For example, components of product stored in the bin may have a tendency to exert tactile pressure upon each other such that the components bridge dispensing chute 16 or otherwise clump together. An agitating mechanism or other device may be employed to overcome this tendency. An agitator 74, shown in FIG. 19, is linked to and moved by handle 22. Movement of agitator 74 against the stored bulk material allows the bulk material, including difficult-to-dispense items, to flow under the force of gravity with the assistance of the agitator. Further details of agitators are provided in commonly-owned U.S. Pat. No. 7,178,697 to Brundick et al., the disclosure of which is herein incorporated by reference. For the sake of clarity FIG. 19 is shown with handle 22 in a "closed" position for dispensing product from bin 10, while gate 23 is shown in an "open" dispensing position.

In order to help maintain the freshness of product stored therein, the various embodiments of bin 10 are preferably configured such that a substantially air-tight seal of the interior portions of the bin is accomplished when product is not being placed into or dispensed from the bin. Accordingly, suitable seals, sealants and sealing elements may be placed at any openings, interfaces and joints of bin 10 as needed to achieve the substantially air-tight seal. Referring to FIGS. 24, 25, 29 and 30, as a non-limiting example, a gate seal 76 may be utilized to form a substantially air-tight seal about dispensing gate 23 when the dispensing gate is in the closed position. Gate seal 76 may be made of any suitable resilient, elastomeric material, such as rubber, plastic, composite or thermoplastic elastomer (TPE).

Gate seal 76 includes an opening 75 in communication with dispensing chute 16 (see also FIGS. 10 and 11). When dispensing gate 23 is in the closed position, the dispensing gate blocks opening 75 of the dispensing chute 16 and gate seal 76 forms a seal between the opening and the dispensing gate. In a non-agitation application without agitator 74, gate seal 76 may further include a metering flange 78 (FIGS. 24, 29) as described below. In moving to the open dispensing position, dispensing gate 23 is rotated away from opening 75 at a distal end 82 of dispensing chute 16 and is positioned outside of dispensing chute 16. In the open position dispensing gate 23 is received by a pocket 80 formed between spout 65 and dispensing chute 16. As such, when dispensing gate 23 is within pocket 80, the dispensing gate is intermediate dispensing chute 16 and spout 65. As pocket 80 is formed at the proximal end of spout 65, it protects the user from pinching fingers in dispensing gate 23 as the dispensing gate moves into the open position.

In a non-agitation application, metering flange 78 extends downwardly facing and is fixedly positioned near an upper portion of opening 75 at distal end 82 of dispensing chute 16. Metering flange 78 prevents bulk material product from accumulating and compacting at distal end 82 of dispensing chute 16. Metering flange 78 creates an air gap 86 at the upper edge of distal end 82 that allows dispensing gate 23 to close without pinching the bulk material product. In one embodiment, metering flange 78 is formed as a separate piece from gate seal 76.

Gate seal 76 may have an annular sleeve shape which is configured to receive and engage a distal end 82 of dispensing chute 16. Gate seal 76 may include interfit features 84 to secure the gate seal to distal end 82 by preventing the gate seal from slipping off. Any suitable interfit features 84 may be utilized, such as, without limitation, tongue and groove or protrusions and channels. As gate seal 76 may be formed of suitable elastomeric material, it may be deformed slightly when connected to distal end 82, and interfit features 84 act to secure the gate seal in place.

In some embodiments, gate seal 76 may be configured to couple to or be formed as part of dispensing gate 23. As such, when dispensing gate 23 is in the closed position, the dispensing gate selectably engages the gate seal against opening 75 of dispensing chute 16. In alternative embodiments, dispensing gate 23 moves by other mechanisms to block opening 75, such as, without limitation, by sliding. Accordingly, the embodiments allow for one or more suitable resilient sealing elements to be placed or moved into place at the interface between opening 75 and dispensing gate 23 of bin 10 as needed to achieve the substantially air-tight seal.

A common problem with gravity-feed bins is the tendency for certain products dispensed by the bins to somewhat adhere or "stick" together, making dispensing of these products difficult. Similarly, products having certain shapes tend to jam together and resist dispensing. Agitator 74, discussed above, aids to overcome such adhesion and jamming problems. Several features that also aid to overcome these problems are discussed below.

Figure 23:
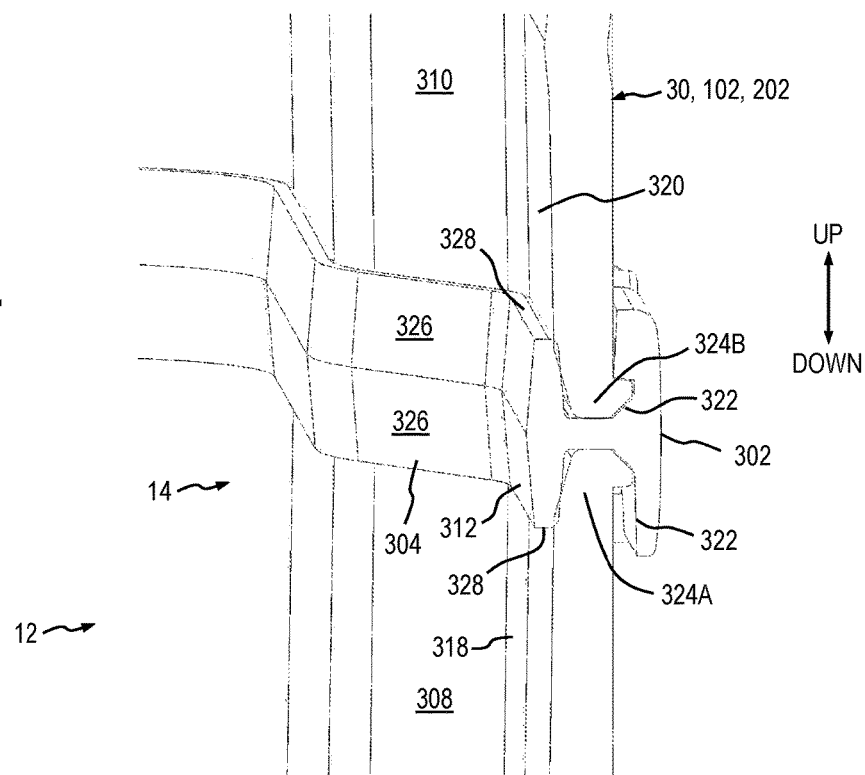
FIG. 23 is a second partial expanded view of a seal element according to an embodiment of the present invention.

With reference to FIGS. 20, 21, 22, 23 and 24, in some embodiments of the present invention a bin 10 may include a seal element 302. Seal element 302 is configured with an interior portion 304 that is generally in communication with storage reservoir 14 in the interior of main bin 12, the capacity of which may be extended as desired with any suitable quantity of extension sections 30, 102, 202 as discussed above. Interior portion 304 of seal element 302 may include a first inwardly-facing, generally flush portion 306 (FIG. 22) that does not substantially extend away from an interior wall 308 of main bin 12 and/or interior walls 310 of any extension sections 30, 102, 202 coupled to the seal element, into storage reservoir 14. Interior portion 304 of seal element 302 may further include a second inwardly-facing portion 312 that extends generally away from interior wall 308 of main bin 12 and/or corresponding interior walls 310 of any extension sections 30, 102, 202 coupled to the seal element, as shown in FIG. 23.

Certain soft and sticky products have a tendency to compress and form a relatively dense mass, which can in some circumstances render the products difficult to dispense from bin 10. In one embodiment of the present invention inwardly-facing portions 306, 312 of seal element 302 are arranged on opposing sides of the seal element and thus on opposing sidewalls of main bin 12 and/or opposing sidewalls of extension sections 30, 102, 202. This arrangement of inwardly-facing portions 306, 312 aids to meter certain products to be dispensed from bin 10, as generally indicated by the arrows shown in FIG. 21. For example, the generally flush, inwardly-extending first portion 306 of seal element 302 may be arranged along a first interior sidewall 314 of interior wall 308 of main bin 12 and a corresponding first interior sidewall 316 of interior wall 310 of an adjacent extension section 30, 102, 202 (FIG. 22) while the inwardly-extending second portion 312 of the seal element is arranged along a second, opposing interior sidewall 318 of the interior wall of the main bin and a corresponding second, opposing sidewall 320 of the interior wall of the adjacent extension section (FIG. 23). This allows the product to be dispensed to be essentially supported by second inwardly-facing seal portion 312 of seal element 302 and rolled downwardly along the second interior sidewalls 318, 320, past the generally flush first inwardly-facing portion 306 of the seal element. This aids to deter compression of the product and also removes some of the weight of the product from agitator 74 (FIG. 19), allowing the agitator to move more freely under the product. A seal element 302 with opposing interior portions 306, 312 may be inserted between main bin 12 and an adjacent extension section 30, 102, 202 and/or between adjacent extension sections.

The number, length and locations of inwardly-facing seal portions 306, 312 may be varied within the scope of the invention. As a non-limiting example, two sets of opposing inwardly-facing seal portions 306, 312 may be utilized with a generally rectangularly-shaped main bin 12 and correspondingly-shaped extension sections 30, 102, 202. Referring again to FIGS. 20-23, main bin 12 includes opposing connectors on open end 32: a connector 324C adjacent first bin interior sidewall 314 and a connector 324A adjacent second bin interior sidewall 318. Extension sections 30, 102, 202 include opposing connectors on a downward end: a connector 324D adjacent first extension interior sidewall 316 and a connector 324B adjacent second extension interior sidewall 320. Connectors 324 D and 324B are coupled to connectors 324C and 324A by intermediate seal 302. Similarly, extension sections 30, 102, 202 include opposing connectors on an upward end: a connector 324C' adjacent first extension interior sidewall 316 and a connector 324A' adjacent second extension interior sidewall 320. Connectors 324 C' and 324A' may be coupled to either adjacent connectors 324D and 324B by intermediate seal 302 or to sealing lid 36.

The shape of seal element 302 may be varied to suit a particular bin 10. For example, a pair of opposing receptacles 322 may be shaped to sealingly and detachably engage connectors 324A and 324C of main bin 12 and connectors 324B and 324D of extension sections 30, 102, 202. In addition, inwardly-facing seal portions 306, 312 may be provided in any suitable shape including, but not limited to, one or more angled generally planar surfaces 326, with or without one or more opposing ledges 328 as generally shown in FIG. 23. In other alternative examples inwardly-facing seal portions 306, 312 may be generally semi-circularly shaped, tapered, or a generally planar surface with or without one or more ledges 328. Furthermore, ledges 328 may be oriented generally orthogonally to sidewalls 314, 316, 318, 320, or may be angled or tapered with respect to the sidewalls.

Any transitions between inwardly-facing seal portions 306 and 312 may be made in any suitable manner such as, without limitation, a step between first inwardly-facing seal portion 306 and second inwardly-facing seal portion 312. Alternatively, the aforementioned transition may be gradual or tapered.

Sealing element 302 is otherwise similar to sealing element 34, discussed above.

Figure 24:
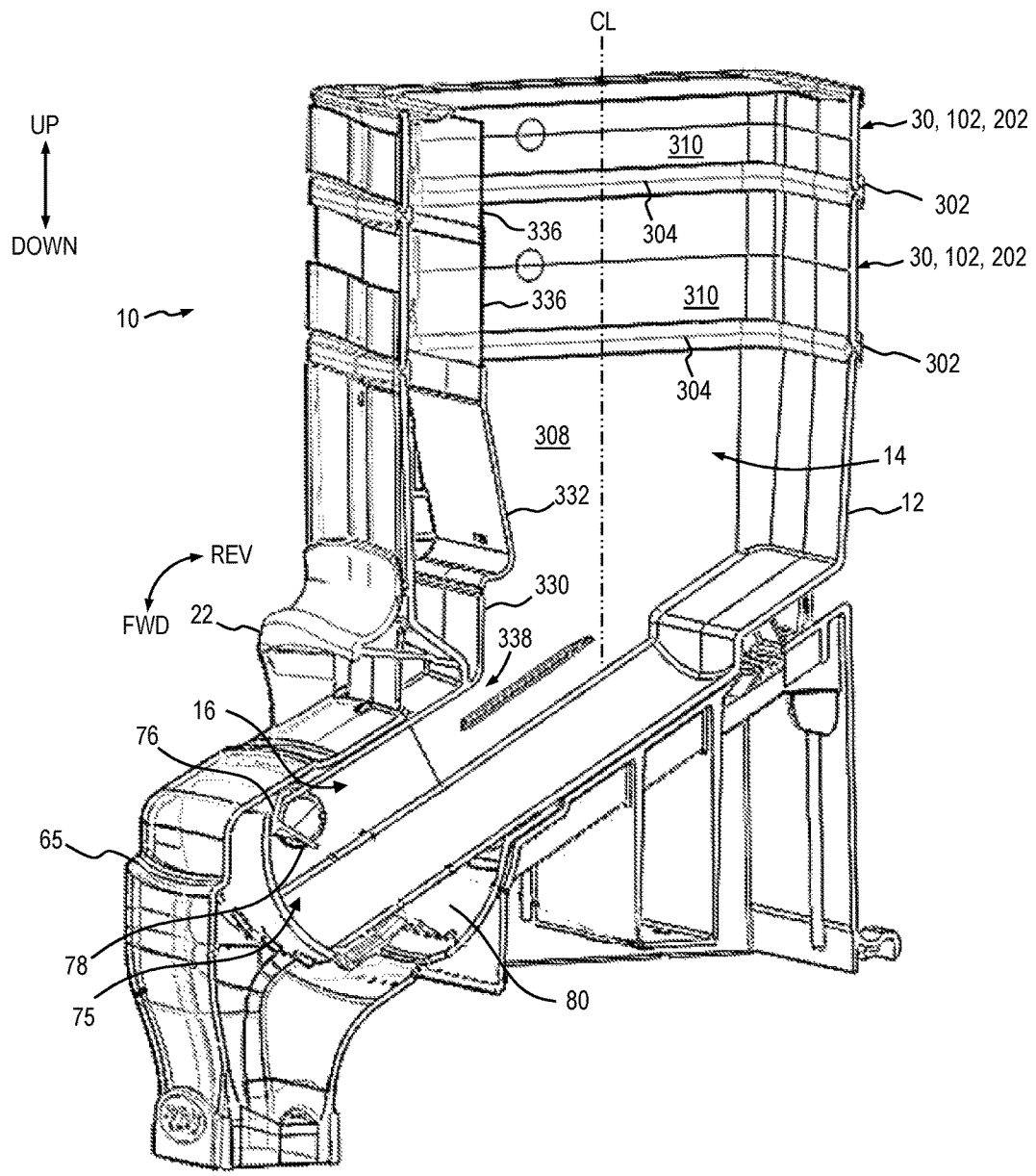
FIG. 24 is a view in section of a gravity-feed bin according to another embodiment of the present invention.
Figure 25:
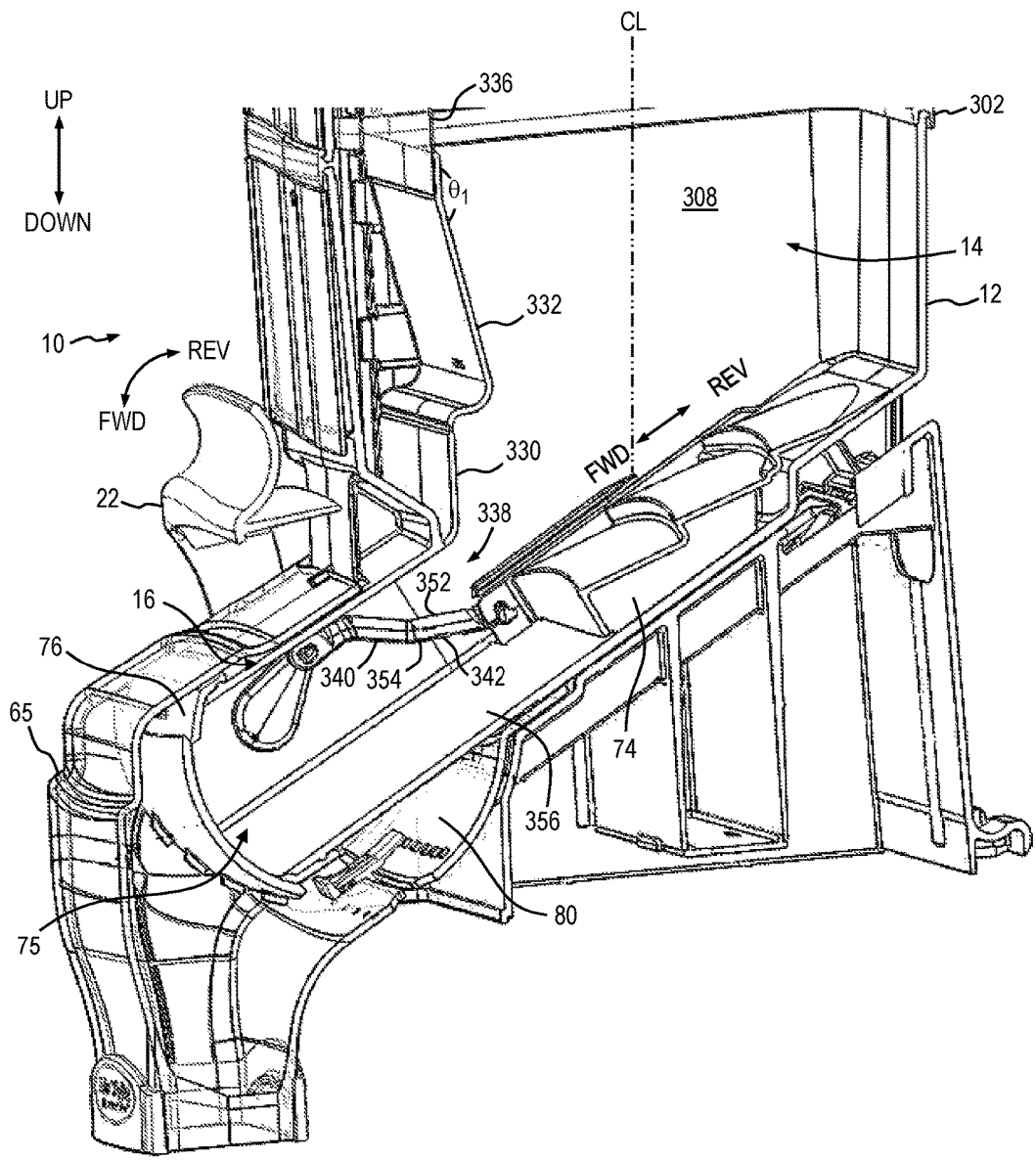
FIG. 25 is a view in section of a gravity-feed bin according to yet another embodiment of the present invention.
Figure 26:
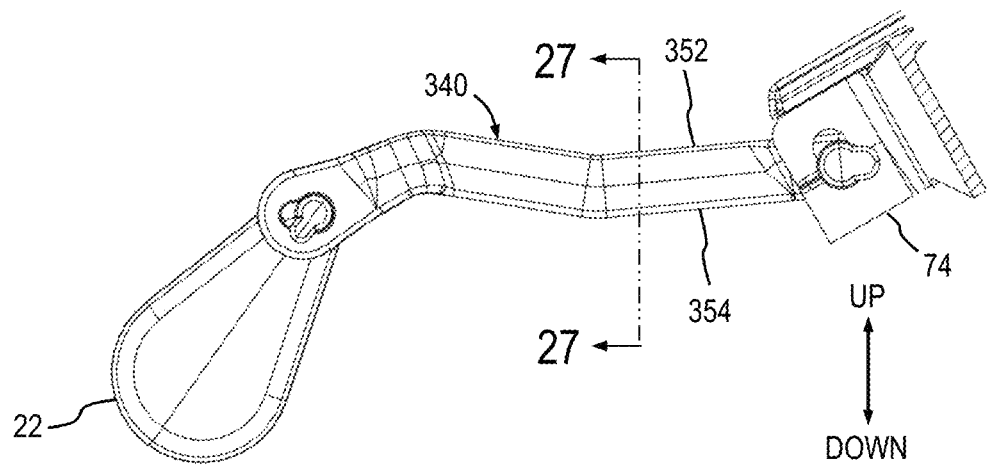
FIG. 26 is an expanded view of a link of the gravity-feed bin of FIG. 25.
Figure 28:
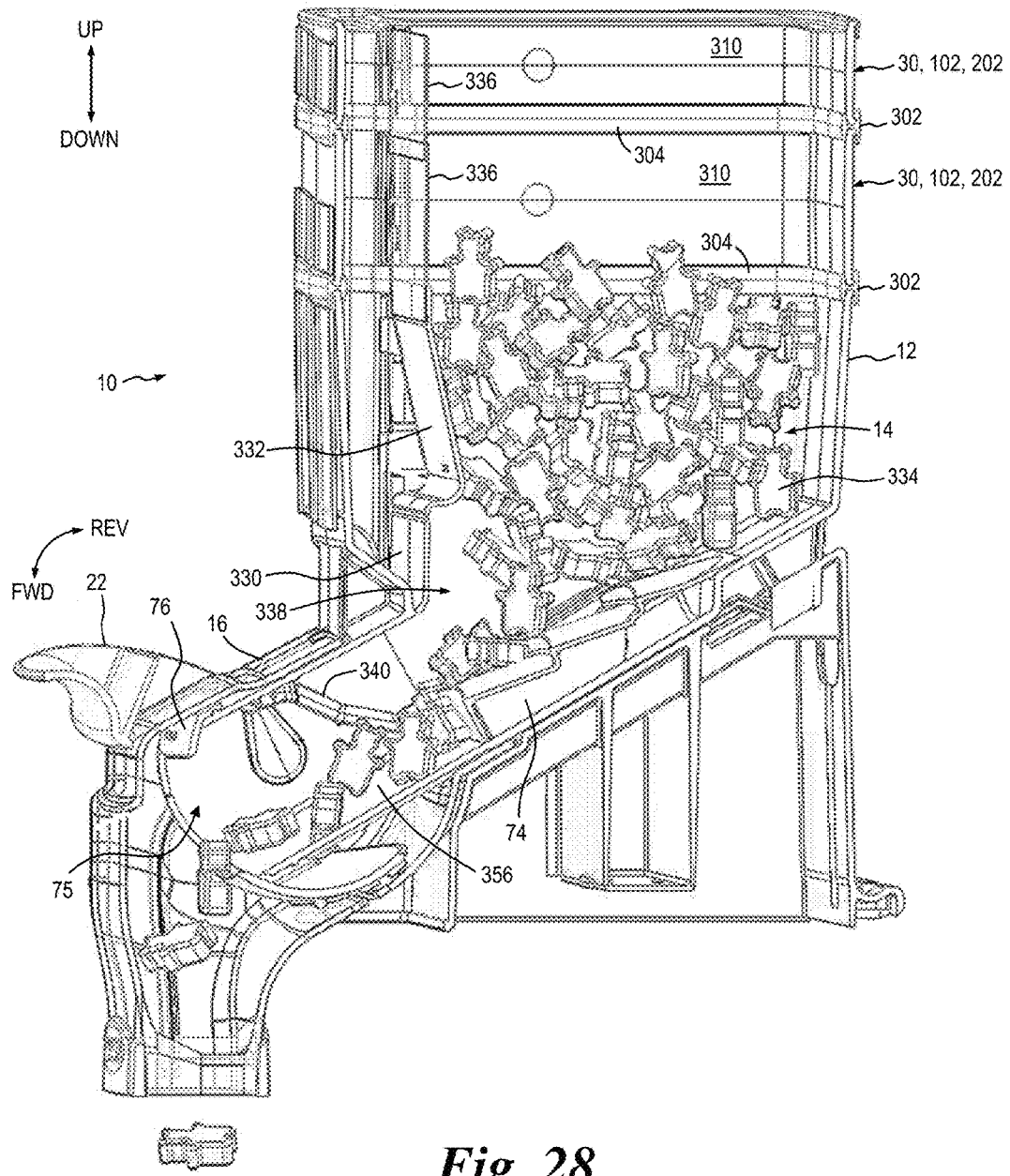
FIG. 28 is a view in section of a gravity-feed bin showing various features of the embodiments of FIGS. 20-27 in combination.
Figure 29:
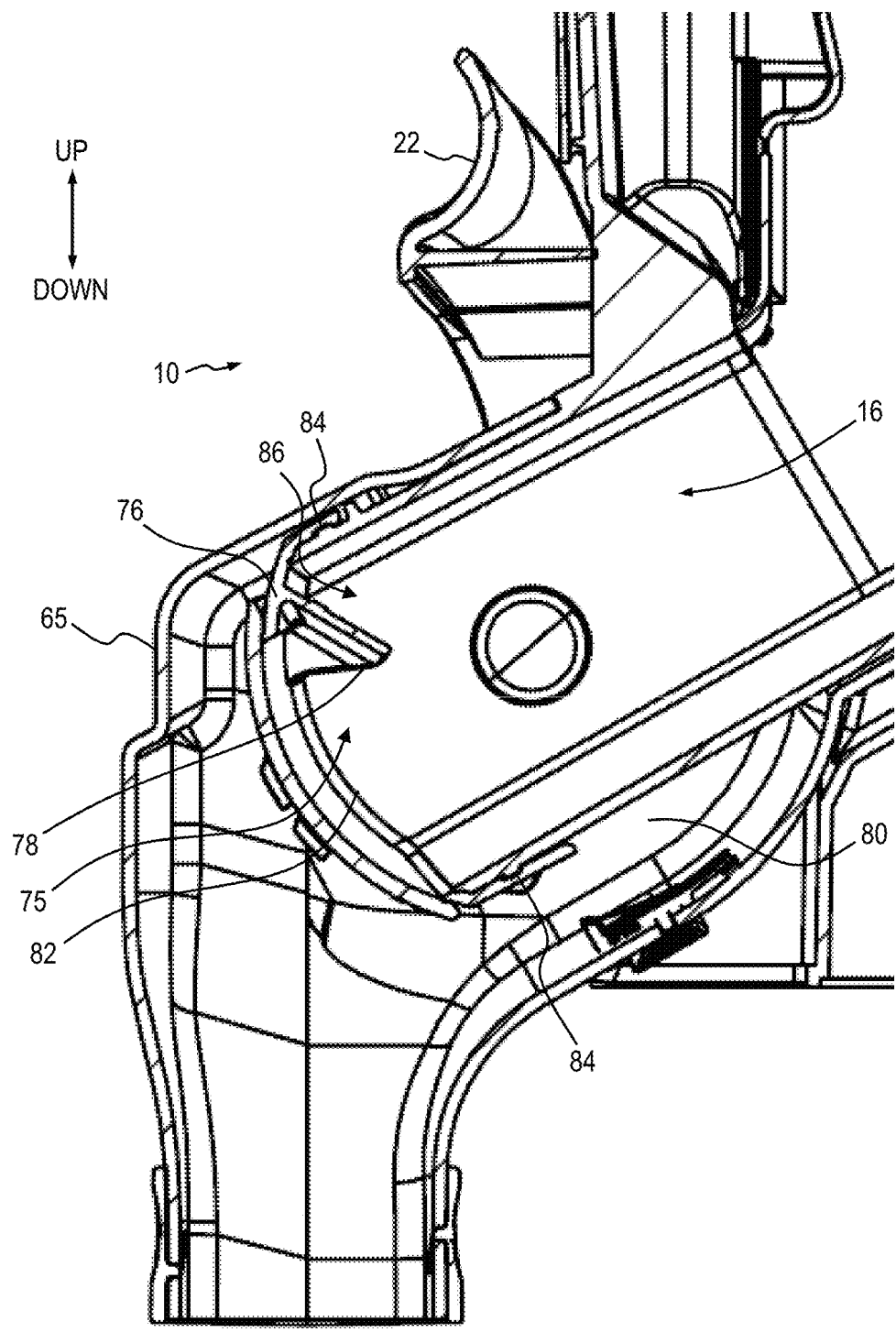
FIG. 29 is a partial view of a non-agitation type gravity-feed bin according to yet another embodiment of the present invention.
Figure 30:
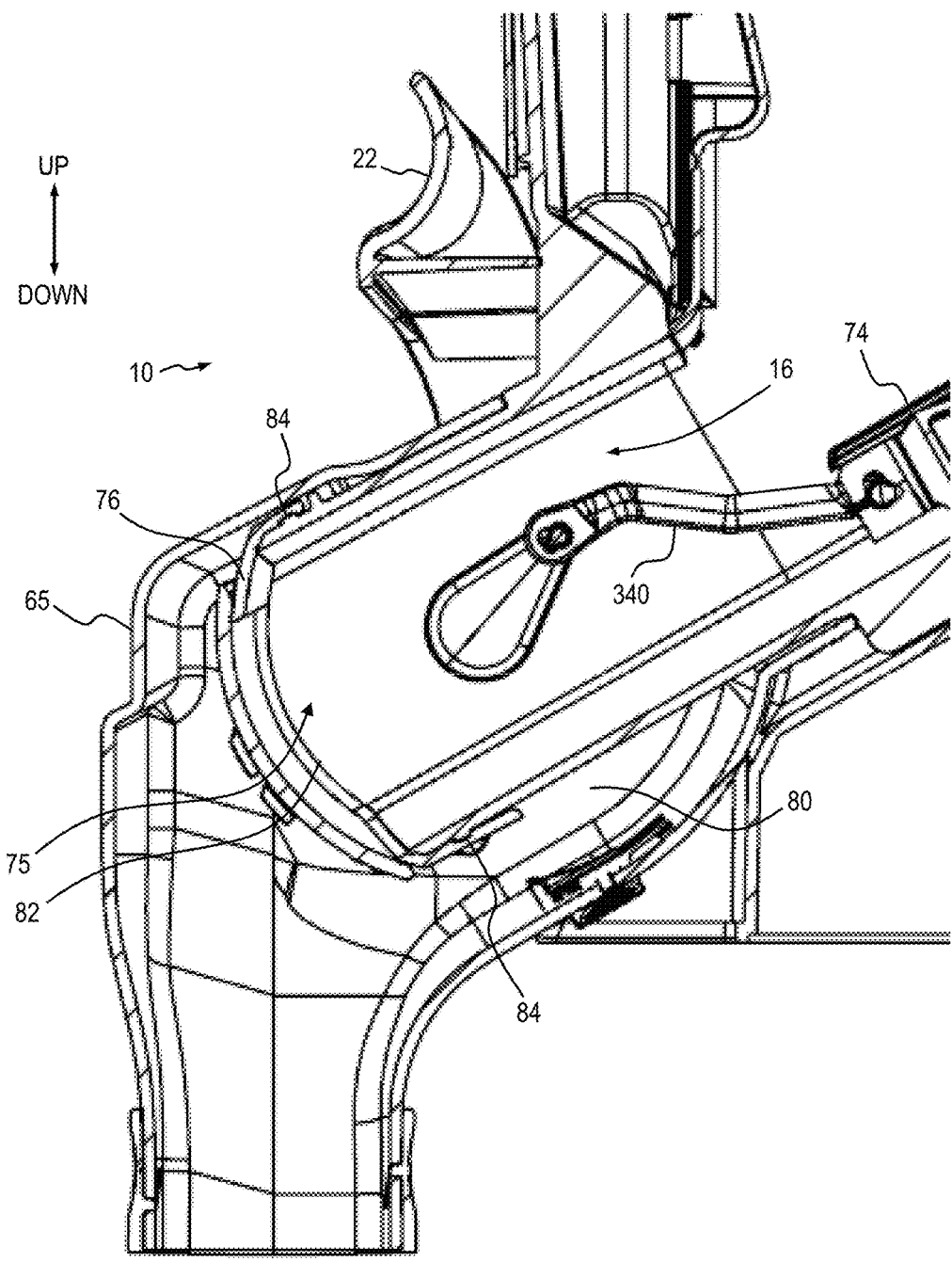
FIG. 30 is a partial view of an agitation type gravity-feed bin according to yet another embodiment of the present invention.

With reference to FIGS. 24, 25 and 28, in some embodiments of the present invention bin 10 may include at least one baffle 330. Baffle 330 may include a first portion 332 that is generally angled at an angle $\theta_1$ inwardly toward a centerline "CL" of main bin 12 and of any extension sections 30, 102, 202 coupled to the main bin. Angle $\theta_1$ is not critical and may be varied to suit particular types, sizes, shapes, etc. of product 334.

Extension sections 30, 102, 202 may include baffle extensions 336 that detachably couple to one another and to baffle 330 to extend the baffle into the extension sections when the extension sections are coupled to main bin 12.

First portion 332 is arranged to meter product 334 stored in reservoir 14 for dispensing through dispensing chute 16 as described above. Baffle 330 thus aids to deter the product 334 from flooding and blocking an inner spout 338 proximate dispensing chute 16.

Figure 27:
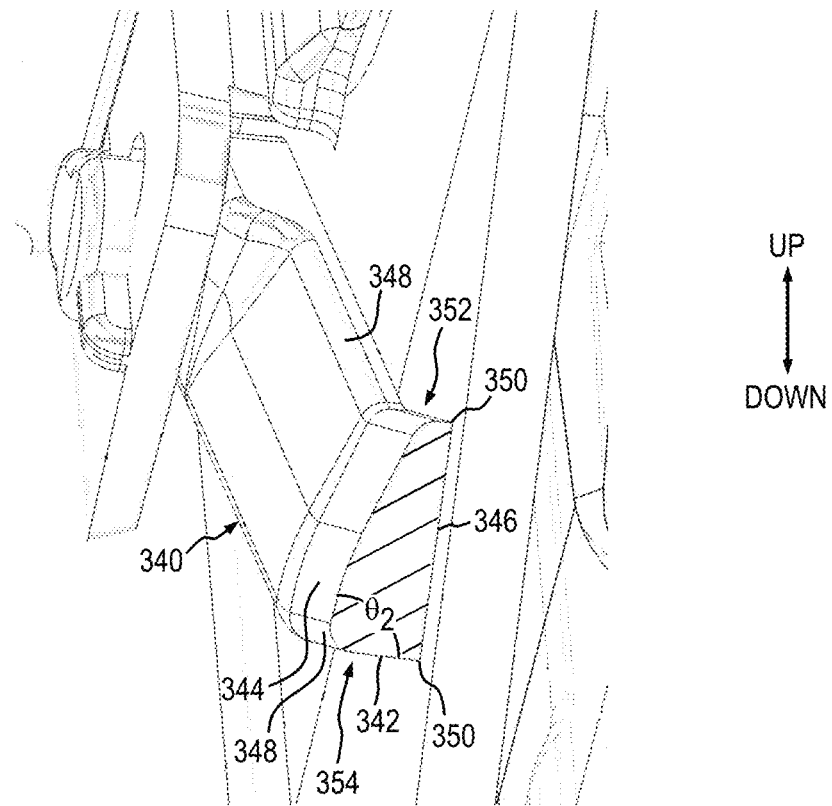
FIG. 27 is a view in section of the link of FIGS. 25 and 26.

With reference now to FIGS. 25, 26, 27 and 28 together, when an agitator 74 is employed a link 340 extends between handle 22 and the agitator such that forward and reverse rotation of the handle causes corresponding forward and reverse slidable movement of the agitator. Link 340 may be shaped with a suitable geometry to aid in the dispensing of product 334. For example, link 340 may be generally triangularly- or wedge-shaped in section, as shown in FIG. 27. In this embodiment link 340 includes a first side 342 and a second side 344 that is generally oriented at a predetermined angle $\theta_2$ with respect to the first side. A third side 346 extends between first and second sides 342, 344. Link 340 may further include one or more rounded or chamfered corners 348 and/or relatively sharp corners 350.

A relatively narrow first end 352 of link 340 allows the link to more easily pass by or through product 334 when agitator 74 is articulated reversely into main bin 12 (i.e., generally away from dispensing chute 16). An opposing, generally planar second end 354 includes first side 342 and typically has a width greater than that of first end 352. First side 342 is preferably arranged such that the plane of the first side is oriented generally parallel to a dispensing surface 356 of dispensing chute 16. Dispensing surface 356 is the bottom portion of dispensing chute 16. Second end 354 aids to push product 334 generally toward dispensing chute 16 when agitator 74 is moving forwardly (i.e., generally toward the dispensing chute). Dispensing surface 356 defines a portion of the dispensing path; the dispensing path including downward along the dispensing surface, through opening 75 and downward through lower spout 20. Gate 23 is configured to selectably rotate about dispensing surface 356, between open and closed positions.

Angle $\theta_2$ is not critical and may be varied to suit particular types, sizes, shapes, etc. of product 334. In addition, the shape of link 340 may be varied. As a non-limiting example, any or all of sides 342, 344, 346 may include curved portions and/or generally planar faceted portions.

Referring to FIGS. 31-33 and 36, in one embodiment, bin 10 may include a gasket lid 436 having a lid base 438 and a sealing gasket 440. Gasket lid 436 is configured to selectably couple to bin 10. Preferably, sealing gasket 440 selectably engages and provides a substantially air-tight seal of edge 42 of main bin 12 or the second edge 52 of the of the uppermost extension section 30, 102, 202. Sealing gasket 440 includes a sealing receptacle 442 that is sized and shaped to sealingly engage at least the upper surface and interior facing surfaces of the bin upper connectors they are sealed against (connectors 324A and 324C of main bin 12 or connectors 324A' and 324C' of extension sections 30, 102, 202; see connectors in FIGS. 20-23). The size and shape of the gasket lid is configured to match the type of bin 10, for example, gasket lid 436 is matched to the shape of a non-agitation type of bin 10 (see bin in FIG. 24), and a gasket lid 444 (FIGS. 34, 35) is matched to the shape of an agitation type of bin 10 (see bin in FIG. 25).

Referring again to FIGS. 31-35, in one embodiment, gasket lid 436, 444 includes latches 446 configured to selectably secure the gasket lid to main bin 12 or to extension section 202. Latches 446 are configured to be flexible, so as to bend and deform to connect to second protrusions 208 (see FIG. 8). Latches 446 engage second protrusions 208, thereby selectably coupling to the extension section 202 or to main bin 12. Although latches 446 and second protrusions 208 are shown, gasket lid 436, 444, main bin 12 and extension section 202 may include any suitable cooperating, interlocking structure or fastener arrangement for selectable securement of the gasket lid.

The gasket lid may be made from any suitable materials such as, without limitation, plastic, metal, composites and rubber. The sealing gasket may be made of any suitable resilient, elastomeric material, such as plastic, rubber or composites. Preferably, the gasket lid may be made of a polypropylene lid base with an over-molded TPE sealing gasket. In some embodiments, sealing gasket 440 is configured as a separate seal element from lid base 438. In use, such sealing gasket 440 may be coupled to edge 42 of main bin 12 or the second edge 52 of the uppermost extension section 30, 102, 202 and then selectably engaged against lid base 438.

Gate seal 76 (e.g. FIG. 10, 11, 29, 30) may be formed in various shapes, configurations, and flexible (e.g. rubber-like) materials to obtain a suitable seal with the gate 23. Such materials are chosen to be compatible with the material being dispensed, and further may utilize different durometers and colors.

Gate seal 76 may utilize various topographies to create a seal with gate 23. For example, one or more fins 500 in contact with gate 23 are useful to seal and clean/wipe product from gate 23. Fins 500 are sufficiently flexible so as to be adapted to conform to the shape of gate 23. In other aspects, fins 500 are operatively connected to chute 16 and may not necessarily be connected to gate seal 76. As shown in FIGS. 37A & B, fins 500 can interface with gate 23 on either a convex side or alternatively an opposing concave side.

Gate seal 76 may be attached to chute 16 in various ways. Non exhaustive examples include: a T-type member 501 located on gate seal 76 (FIG. 38) that cooperatively mates into a receiving groove 502 disposed on dispensing chute 16; snap features with round or square receivers (e.g. interfit features 84, FIGS. 29,30 described elsewhere); or compression ring 503 surrounding gate seal 76 (FIG. 10) to hold it in place against dispensing chute 16. Alternatively, rubber over-molding can be used wherein seal 76 is molded directly onto dispensing chute 16 forming one component.

In one aspect, seal 76 circumferentially surrounds and captures the full dispensing area of dispensing opening 24. Other embodiments may include a partial contact feature that mate to various portions of the dispensing chute 16, which may include bottom ledge contact only, top ledge contact only, side contact, or combination of the features mentioned.

Dispensing chute 16 and gate seal 76 are rectangular in some aspects. However, other shapes are possible, such as round, oval, or square, as applied to both the seal exterior and interior.

While this invention has been shown and described with respect to detailed embodiments thereof, it will be understood by those skilled in the art that changes in form and detail thereof may be made without departing from the scope of the claims of the invention.

What is claimed is:

1. A gravity-feed bin for storage and dispensing of bulk material, comprising:
   a generally hollow main bin having:
      an open end configured to receive a bulk material,
      a storage reservoir configured to store the bulk material,
      a vertical front wall, and
      a dispensing chute configured to dispense the bulk material;
   an upper spout coupled to the dispensing chute;
   the upper spout having an exterior surface that projects outwardly from the vertical front wall;
   a lower spout coupled to the upper spout;
   the lower spout being downwardly oriented;
   the lower spout having an exterior surface adjacent to the exterior surface of the upper spout;
   the exterior surface of the lower spout being disposed outwardly from the vertical front wall;
   the dispensing chute, the upper spout, and the lower spout being configured such that the bulk material flows through the dispensing chute, then through the upper spout, and is then discharged through the lower spout.

2. The gravity-feed bin of claim 1, further comprising: a rotatable handle operatively connected to a gate, the gate being configured to selectably rotate between open and closed positions, wherein an opening of the dispensing chute is covered in the closed position by the gate.

3. The gravity-feed bin of claim 1, further comprising: the rotatable handle being operatively connected to an agitator, wherein rotation of the handle causes the agitator to agitate, thereby facilitating dispensation of the bulk material.

* * * * *